(12) United States Patent
Dehghan-Fard et al.

(10) Patent No.: US 12,052,189 B2
(45) Date of Patent: *Jul. 30, 2024

(54) EARLY LINK DETECTION BASED ADAPTIVE SELECTION OF RECEIVE PARAMETERS

(71) Applicant: MAXLINEAR, INC., Carlsbad, CA (US)

(72) Inventors: Hossein Dehghan-Fard, Diablo, CA (US); Debashis Dash, Newark, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,979

(22) Filed: May 16, 2022

(65) Prior Publication Data
US 2022/0278790 A1    Sep. 1, 2022

Related U.S. Application Data

(63) Continuation of application No. 16/670,761, filed on Oct. 31, 2019, now Pat. No. 11,362,776.
(Continued)

(51) Int. Cl.
*H04L 5/00* (2006.01)
*H04B 7/06* (2006.01)
(Continued)

(52) U.S. Cl.
CPC ......... *H04L 5/0044* (2013.01); *H04B 7/0617* (2013.01); *H04B 7/088* (2013.01);
(Continued)

(58) Field of Classification Search
CPC . H04W 76/11; H04W 72/0446; H04W 52/52; H04W 76/10; H04B 7/0617; H04L 5/0044; H04L 5/0037; H04L 1/0025
See application file for complete search history.

(56) References Cited

U.S. PATENT DOCUMENTS

| 6,577,620 | B1 | 6/2003 | Galyas et al. |
| 7,555,053 | B2 | 6/2009 | Trachewsky et al. |

(Continued)

FOREIGN PATENT DOCUMENTS

| CN | 101977095 A | 2/2011 |
| CN | 107211452 A | 9/2017 |

(Continued)

OTHER PUBLICATIONS

European Patent Application 19 206 876.5 Search Report dated Feb. 14, 2020.

(Continued)

*Primary Examiner* — Phong La
(74) *Attorney, Agent, or Firm* — Buchalter; Jason W. Croft

(57) ABSTRACT

An example method includes detecting arrival of a packet at a receiver node including detecting over the air energy using at least one of the receiver node's antenna sectors. The method includes selecting one or more RF receive parameters based on information or metrics included in or determined from a pre-payload portion of the packet, including at least one of: selecting a first subset of the antenna sectors with better metrics than a second subset of the antenna sectors to receive the payload of the packet; or selecting an antenna polarization with better metrics than another antenna polarization to receive the payload of the packet. The method includes receiving a payload of the packet at the receiver node using the selected RF receive parameters.

20 Claims, 14 Drawing Sheets

Related U.S. Application Data

(60) Provisional application No. 62/755,555, filed on Nov. 4, 2018, provisional application No. 62/853,160, filed on May 27, 2019.

(51) Int. Cl.
| | |
|---|---|
| *H04B 7/08* | (2006.01) |
| *H04L 1/00* | (2006.01) |
| *H04W 52/52* | (2009.01) |
| *H04W 72/0446* | (2023.01) |
| *H04W 76/11* | (2018.01) |

(52) U.S. Cl.
CPC .......... *H04L 1/0026* (2013.01); *H04W 52/52* (2013.01); *H04W 72/0446* (2013.01); *H04W 76/11* (2018.02)

(56) References Cited

U.S. PATENT DOCUMENTS

| | | |
|---|---|---|
| 8,064,835 B2 | 11/2011 | Rezvani et al. |
| 8,421,676 B2 | 4/2013 | Moshfeghi |
| 8,428,168 B1 | 4/2013 | Zhang et al. |
| 9,042,823 B2 | 5/2015 | Palin et al. |
| 9,876,613 B2 | 1/2018 | Venkatsuresh et al. |
| 10,404,429 B2 | 9/2019 | Kim et al. |
| 10,469,140 B1 | 11/2019 | Dehghan et al. |
| 10,567,134 B1 | 2/2020 | Schelstraete |
| 10,862,567 B2 | 12/2020 | Li et al. |
| 11,129,194 B2 | 9/2021 | Lou et al. |
| 11,362,776 B2 | 6/2022 | Dehghan-Fard et al. |
| 2006/0045193 A1 | 3/2006 | Stolpman et al. |
| 2006/0045220 A1 | 3/2006 | Biswas et al. |
| 2009/0252104 A1 | 10/2009 | Zhang et al. |
| 2009/0278742 A1 | 11/2009 | Mehta et al. |
| 2009/0285269 A1 | 11/2009 | Zhang et al. |
| 2010/0008400 A1 | 1/2010 | Chari |
| 2010/0220601 A1 | 9/2010 | Vermani et al. |
| 2011/0194475 A1 | 8/2011 | Kim et al. |
| 2012/0314649 A1 | 12/2012 | Forenza et al. |
| 2013/0107995 A1 | 5/2013 | Husted |
| 2014/0093005 A1 | 4/2014 | Xia et al. |
| 2015/0085944 A1 | 3/2015 | Mobasher et al. |
| 2015/0139072 A1 | 5/2015 | Hong et al. |
| 2015/0230105 A1 | 8/2015 | Negus et al. |
| 2015/0289292 A1 | 10/2015 | Sun et al. |
| 2016/0277132 A1 | 9/2016 | Pratt et al. |
| 2016/0380729 A1 | 12/2016 | Porat et al. |
| 2017/0033850 A1 | 2/2017 | Kasher et al. |
| 2017/0047979 A1* | 2/2017 | Sen ...................... H04W 28/0257 |
| 2017/0230415 A1 | 8/2017 | Xu et al. |
| 2017/0311183 A1 | 10/2017 | Cotanis |
| 2017/0331577 A1 | 11/2017 | Parkvall et al. |
| 2017/0353976 A1 | 12/2017 | Yerramalli et al. |
| 2018/0152325 A1 | 5/2018 | Frank et al. |
| 2018/0167252 A1 | 6/2018 | Wang et al. |
| 2018/0205422 A1 | 7/2018 | Feldhahn et al. |
| 2018/0212669 A1* | 7/2018 | Li ....................... H04B 7/0604 |
| 2018/0213382 A1 | 7/2018 | Tabet et al. |
| 2018/0270029 A1 | 9/2018 | Matsuo et al. |
| 2018/0278320 A1* | 9/2018 | Chendamarai Kannan ................. H04B 7/0811 |
| 2018/0352499 A1* | 12/2018 | Khoury ................ H04W 48/08 |
| 2019/0089504 A1 | 3/2019 | Hwang et al. |
| 2019/0253867 A1 | 8/2019 | Abedini et al. |
| 2019/0253925 A1 | 8/2019 | Gholmieh et al. |
| 2019/0261344 A1 | 8/2019 | Grant et al. |
| 2019/0349036 A1 | 11/2019 | Wang et al. |
| 2019/0356520 A1 | 11/2019 | Silverman et al. |
| 2020/0029359 A1 | 1/2020 | Chen et al. |
| 2020/0067675 A1 | 2/2020 | Takeda et al. |
| 2020/0359264 A1 | 11/2020 | Rácz et al. |
| 2021/0029530 A1 | 1/2021 | Abedini et al. |
| 2022/0045554 A1* | 2/2022 | Leabman ................ H02J 50/40 |

FOREIGN PATENT DOCUMENTS

| | | |
|---|---|---|
| EP | 2940887 A1 | 11/2015 |
| EP | 3214785 A1 | 9/2017 |
| EP | 3346764 A1 | 7/2018 |
| GB | 2414896 A | 12/2005 |
| TW | 201735676 A | 10/2017 |
| WO | 2016049833 A1 | 4/2016 |

OTHER PUBLICATIONS

Examination Report in European Patent Application 19 206 876.5 dated Sep. 2, 2021.

Gao, X; Edfors, 0.; Liu, J.; Tufvesson, F.; "Antenna Selection in Measured Massive MIMO Channels using 3onvex Optimization"; IEEE Globecom Workshop, 2013, Atlanta Georgia U.S. 2013.

Gao, X. ; Edfors, 0.; Tufvesson, F. ; Larsson, E.G.; Massive MIMO in Real Propagation Environments: Do all Antennas Contribute Equally; IEEE Transactions on Communications Jan. 1, 2015.

Gao, X. ; Edfors, 0.; Tufvesson, F. ; Larsson, E.G.; "Multi-Switch for Antenna Selection in Massive MIMO"; IEEE Global Communications Conference, Globecom 1015.

L. Lu; G.Y. Li; A.L. Swindlehurst, A. Ashikhmin; R. Zhang; "An Overview of Massive MIMO Benefits and Thallenges"; IEEE Journal of Selected Topics in Signal Processing, vol. 8, No. 5; Oct. 2014.

T-H Tai, W-H Chung, T-S Lee; "A Low Complexity Antenna Selection Algorithm for Energy Efficiency in Massive MIMO Systems"; DSDIS, 2015 IEEE; Dec. 11-13, 2015.

T-W Ban; B. C. Jung; A Practical Antenna Selection Technique in Multiuser Massive MIMO Networks; IEICE Trans. Bommun. vol. E96-B, No. 11 Nov. 2013.

Tung et al. "Analog Man-in-the-Middle Attack Against Link-Based Packet Source Identification" In Proceedings of the 17th ACM International Symposium on Mobile Ad Hoc Networking and Computing (MobiHoc '16). Association for Computing Machinery, New York, NY, USA, 331-340. DOI:https://doi.org/10.1145/2942358. 2942361.

UnPublished Pending Utility U.S. Appl. No. 15/462,903, filed Mar. 19, 2017 Sigurd Schelstraete, Title: WiFi Antenna Selection with Beamforming.

Office Action in Taiwan Application No. 108139957 dated Mar. 7, 2023.

Extended European Search Report for European Application No. 23203227.6, dated Dec. 19, 2023, 12 pages.

Office Action for Chinese Application No. 201911067273.7, dated Jun. 22, 2023, 16 pages.

Office Action for Chinese Application No. 201911067273.7, dated Nov. 21, 2023, 12 pages.

Wang W., et al., "Privacy-Preserving Location Authentication in Wi-Fi Networks Using Fine-Grained Physical Layer Signatures", IEEE Transactions on Wireless Communications, Oct. 6, 2015, pp. 1-13.

Zhang R., "Research and Standardization of Wireless Resource Management Technology for 5G Networks", Full-text Database of China's Outstanding Doctoral and Master's Degree Theses (Master's) Information Technology Series, Apr. 15, 2018.—Abstract.

* cited by examiner

EARLY LINK DETECTION BASED ADAPTIVE SELECTION OF RECEIVE PARAMETERS

CROSS-REFERENCE TO RELATED APPLICATIONS

This patent application is a continuation of U.S. application Ser. No. 16/670,761 filed on Oct. 31, 2019 which claims the benefit of prior filed U.S. Provisional Application No. 62/755,555 filed on Nov. 4, 2018 and prior filed U.S. Provisional Application No. 62/853,160 filed on May 27, 2019.

This patent application is related to co-pending U.S. application Ser. No. 15/727,668 filed on Oct. 9, 2017.

The Ser. No. 16/670,761 application, the 62/755,555 application, the 62/853,160 application, and the Ser. No. 15/727,668 application is each incorporated herein by reference.

FIELD

The implementations discussed herein are related to early link detection based adaptive selection of receive parameters.

BACKGROUND

Unless otherwise indicated herein, the materials described herein are not prior art to the claims in the present application and are not admitted to be prior art by inclusion in this section.

Home, office, stadium, and outdoor networks, a.k.a. wireless local area networks (WLAN) are established using a device called a Wireless Access Point (WAP). The WAP may include a router. The WAP wirelessly couples all the devices of the local network, e.g. wireless stations such as: computers, printers, televisions, digital video (DVD) players, security cameras and smoke detectors to one another and to the Cable or Subscriber Line through which Internet, video, and television is delivered to the local network. Most WAPs implement the IEEE 802.11 standard which is a contention-based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad", "ax". Communications follow a hub and spoke model with a WAP at the hub and the spokes corresponding to the wireless links to each 'client' device.

After selection of a communication channel(s) for the associated local network, access to the shared communication channel(s) relies on a multiple access methodology identified as Collision Sense Multiple Access (CSMA). CSMA is a distributed random access methodology for sharing a single communication medium, by having a contending communication link back off and retry access if a prospective collision on the wireless medium is detected, i.e. if the wireless medium is in use.

In some related art approaches, packet detection and decoding requires the best antenna and receive (RX) beamforming (BF) pattern selection to use for optimal performance in the presence of directional sectorized antennas.

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example implementations described herein generally relate to early link detection based adaptive selection of receive parameters. Some implementations provide a method and/or apparatus to adaptively select receive parameters based on early link detection.

In some other approaches, a packet with a frame that includes a MAC header is received. The frame, including the MAC header, is decoded. The link and/or source may be identified from the decoded MAC header. In comparison, and according to embodiments described herein, the link and/or source may be identified before the MAC header is decoded, e.g., using the legacy preamble, or receive directionality.

Accordingly, an example method includes detecting arrival of a packet at a receiver node having multiple antenna sectors, including detecting over the air energy using at least one of the antenna sectors. The method includes selecting one or more RF receive parameters of the receiver node based on information included in or determined from a pre-payload portion of the packet, including at least one of: selecting a first subset of the antenna sectors of the receiver node that each has one or more sector-specific metrics that is better than one or more sector-specific metrics of each of a second subset of the antenna sectors to receive the payload of the packet; or selecting an antenna polarization to receive the payload of the packet based on one or more metrics included in or determined from the pre-payload portion of the packet, the selected antenna polarization having better one or more metrics than an other antenna polarization. The method includes receiving a payload of the packet at the receiver node using the selected one or more RF receive parameters.

Another example method includes detecting arrival of a packet at a receiver node having multiple antenna sectors using a first subset of the antenna sectors. Each antenna sector included in the first subset has an omni receive pattern during detection of the over the air energy. A second subset of the antenna sectors is turned off or deactivated during detection of the over the air energy. The method includes selecting one or more RF receive parameters of the receiver node based on information included in or determined from a pre-payload portion of the packet. The method includes receiving a payload of the packet at the receiver node using the selected one or more RF receive parameters.

Another example method includes setting an RF footprint of each antenna sector in a first subset of multiple antenna sectors to an omni receive pattern. The method includes detecting arrival of a packet at a receiver node having the antenna sectors, including detecting over the air energy using each antenna sector in the first subset having its RF footprint set to the omni receive pattern. The method includes setting the RF footprint of each of the antenna sectors to a coarse quasi-omni receive pattern to determine from a pre-payload portion of the packet one or more sector-specific metrics for each of the antenna sectors. The method includes selecting one or more RF receive parameters of the receiver node based on the one or more sector-specific metrics determined for each of the antenna sectors, including selecting a second subset of the antenna sectors to receive the payload of the packet. The method includes setting the RF footprint of each antenna sector in the second subset of the antenna sectors to a fine directional receive pattern. The method includes receiving the payload of the packet at the receiver node using the second subset of the antenna sectors having the fine directional receive pattern.

The subject technology of the present invention is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses or portions thereof may be combined in any combination, and placed into an independent clause, e.g., Clauses 1, 14, and 15. The other clauses can be presented in a similar manner. The following is a non-limiting summary of some examples presented herein.

Clause 1. A method, comprising:
receiving a pre-payload portion of a packet at a receiver node;
identifying a link associated with a sender node of the packet based on the pre-payload portion;
selecting and loading one or more baseband receive parameters associated with the identified link at the receiver node; and
receiving a payload of the packet at the receiver node using the one or more baseband receive parameters.

Clause 2. The method of clause 1, wherein loading the one or more baseband receive parameters at the receiver node comprises configuring a baseband circuit of the receiver node with at least one of a specific automatic gain control (AGC) gain and a specific equalizer type.

Clause 3. The method of clause 1, wherein identifying the link based on the pre-payload portion comprises extracting current CSI from the pre-payload portion.

Clause 4. The method of clause 1, further comprising:
determining that a current signature of the identified link has changed and does not correlate to a historic signature of the identified link; and
triggering a security event in response to determining that the current signature of the identified link has changed and does not correlate to the historic signature of the identified link.

Clause 5. The method of clause 3, wherein identifying the link based on the pre-payload portion further comprises determining a current signature of the current CSI.

Clause 6. The method of clause 5, wherein identifying the link based on the pre-payload portion further comprises correlating the current signature against a historic signature of each of one or more links.

Clause 7. The method of clause 6, wherein correlating the current signature against the historic signature of each of the one or more links includes:
calculating a distance metric between the current signature and the historic signature of each of the one or more links; and
selecting a link of the one or more links with a historic signature that is closest to the current signature as the identified link.

Clause 8. The method of clause 6, further comprising loading the one or more historic signatures of the one or more links onto the receiver node, the historic signatures generated by a different device than the receiver node.

Clause 9. The method of clause 6, further comprising generating the historic signature of each of the one or more links.

Clause 10. The method of clause 9, wherein generating the historic signature of each of the one or more links comprises:
extracting over time CSI of each of the one or more links from packets sent to the receiver node over each of the one or more links;
clustering the extracted CSI into groups for each of the one or more links based on one or more source addresses included in the packets, each of the one or more source addresses identifying a corresponding one of one or more sender nodes that include the sender node; and
deriving the historic signature of each of the one or more links from the clustered extracted CSI groupings of each of the one or more links.

Clause 11. The method of clause 6, further comprising, after receiving the payload of the packet at the receiver node:
determining that the current signature of the identified link has changed and does not correlate to a historic signature of the identified link; and
triggering a security event in response to determining that the current signature of the identified link has changed and does not correlate to the historic signature of the identified link.

Clause 12. The method of clause 11, wherein triggering the security event comprises disassociating the sender node from the receiver node.

Clause 13. The method of clause 1, wherein receiving the pre-payload portion of the packet at the receiver node comprises receiving the pre-payload portion of the packet at an access point.

Clause 14. The method of clause 1, wherein receiving the pre-payload portion of the packet at the receiver node comprises receiving the pre-payload portion of the packet at a STA.

Clause 15. The method of clause 1, wherein receiving the pre-payload portion of the packet comprises receiving a L-LTF of the packet.

Clause 16. A method, comprising:
detecting arrival of a packet at a receiver node having a plurality of antenna sectors, including detecting over the air energy using at least one of the plurality of antenna sectors;
selecting one or more radio frequency (RF) receive parameters of the receiver node based on information included in or determined from a pre-payload portion of the packet; and
receiving a payload of the packet at the receiver node using the selected one or more RF receive parameters.

Clause 17. The method of clause 16, wherein selecting the one or more RF receive parameters of the receiver node based on information included in or determined from the pre-payload portion of the packet comprises selecting one or more antenna sectors of the plurality of antenna sectors to receive the payload of the packet based on one or more sector-specific metrics included in or determined from the pre-payload portion of the packet, the selected one or more antenna sectors having better one or more sector-specific metrics than at least one other antenna sector of the plurality of antenna sectors.

Clause 18. The method of clause 16, further comprising:
determining from the pre-payload portion of the packet one or more sector-specific metrics for each of the plurality of antenna sectors; and
comparing the one or more sector-specific metrics of each of the plurality of antenna sectors to each other;
wherein selecting the one or more RF receive parameters of the receiver node based on information included in or determined from the pre-payload portion of the packet comprises selecting a first subset of the plurality of antenna sectors that each has one or more sector-specific metrics that is better than one or more sector-specific metrics of each of a second subset of the plurality of antenna sectors to receive the payload of the packet.

Clause 19. The method of clause 16, wherein selecting the one or more RF receive parameters of the receiver node based on information included in or determined from the pre-payload portion of the packet comprises selecting an antenna polarization to receive the payload of the packet based on one or more metrics included in or determined from the pre-payload portion of the packet, the selected antenna polarization having better one or more metrics than at least one other antenna polarization.

Clause 20. The method of clause 16, wherein selecting the one or more RF receive parameters of the receiver node based on information included in or determined from the pre-payload portion of the packet comprises selecting a receive beamforming pattern to receive the payload of the packet according to a sender node of the packet identified based on the pre-payload portion of the packet.

Clause 21. The method of clause 16, further comprising determining from the pre-payload portion of the packet a sender node that sent the packet to the receiver node, wherein selecting the one or more RF receive parameters of the receiver node based on information included in or determined from the pre-payload portion of the packet comprises selecting a receive beamforming pattern used previously to receive packets from the sender node.

Clause 22. The method of clause 16, wherein detecting over the air energy using at least one of the plurality of antenna sectors comprises detecting over the air energy using a first antenna sector of the plurality of antenna sectors, the first antenna sector having an omni receive pattern during detection of the over the air energy.

Clause 23. The method of clause 16, further comprising determining from the pre-payload portion of the packet one or more sector-specific metrics for each of the plurality of antenna sectors, each of the plurality of antenna sectors having a coarse quasi-omni receive pattern during determination of the one or more sector-specific metrics.

Clause 24. The method of clause 16, wherein receiving the payload of the packet at the receiver node using the selected one or more RF receive parameters of the receiver node comprises receiving the payload of the packet at the receiver node using one or more of the plurality of antenna sectors each having a fine directional receive pattern during receipt of the payload of the packet.

Clause 25. The method of clause 16, further comprising:
allocating unique preamble modulation schemes to a plurality of associated wireless stations (STAs); and
determining from the pre-payload portion of the packet a sender wireless STA from among the plurality of associated wireless STAs that sent the packet to the receiver node;
wherein determining the sender wireless STA comprises identifying a corresponding unique preamble modulation scheme from the pre-payload portion.

Clause 26. The method of clause 16, further comprising determining from the pre-payload portion of the packet a sender node that sent the packet to the receiver node, including extracting at least a portion of an association identifier (AID) from the pre-payload portion, the AID identifying the sender node.

Clause 27. A method, comprising:
receiving a pre-payload portion of a packet at a receiver node;
identifying a link associated with a sender node of the packet based on the pre-payload portion;
selecting and loading one or more baseband receive parameters associated with the identified link at the receiver node;
selecting one or more radio frequency (RF) receive parameters of the receiver node based on information included in or determined from the pre-payload portion of the packet; and
receiving a payload of the packet at the receiver node using the one or more baseband receive parameters and the one or more RF receive parameters.

Clause 28. The method of clause 27, wherein loading the one or more baseband receive parameters at the receiver node comprises configuring a baseband circuit of the receiver node with at least one of a specific automatic gain control (AGC) gain and a specific equalizer type.

Clause 29. The method of clause 27, wherein selecting the one or more RF receive parameters of the receiver node comprises at least one of:
selecting a first subset of a plurality of antenna sectors of the receiver node that each has one or more sector-specific metrics that is better than one or more sector-specific metrics of each of a second subset of the plurality of antenna sectors to receive the payload of the packet;
selecting an antenna polarization to receive the payload of the packet based on one or more metrics included in or determined from the pre-payload portion of the packet, the selected antenna polarization having better one or more metrics than an other antenna polarization; and
selecting a receive beamforming pattern to receive the payload of the packet according to the sender node of the packet identified based on the pre-payload portion of the packet.

Clause 30. The method of clause 27, wherein identifying the link based on the pre-payload portion comprises at least one of:
extracting current channel state information (CSI) from the pre-payload portion;
detecting an energy level of the pre-payload portion at a first antenna sector of a plurality of antenna sectors of the receiver node; and
detecting a current sector-specific metric of the pre-payload portion at each of a plurality of antenna sectors of the receiver node.

Clause 31. The method of clause 27, wherein receiving the pre-payload portion of the packet at the receiver node comprises receiving the pre-payload portion of the packet at one of an access point (AP) or a wireless station (STA).

Clause 32. The method of clause 27, wherein receiving the pre-payload portion of the packet comprises receiving a legacy-long training field (L-LTF) of the packet.

The invention may be implemented in hardware, firmware, or software.

Associated devices and circuits are also claimed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims or may be learned by the practice of the invention as set forth hereinafter.

BRIEF DESCRIPTION OF THE DRAWINGS

To further clarify the above and other advantages and features of the present invention, a more particular description of the invention will be rendered by reference to specific implementations thereof which are illustrated in the appended drawings. It is appreciated that these drawings depict only typical implementations of the invention and are therefore not to be considered limiting of its scope. The invention will be described and explained with additional specificity and detail using the accompanying drawings in which.

Figure 1:
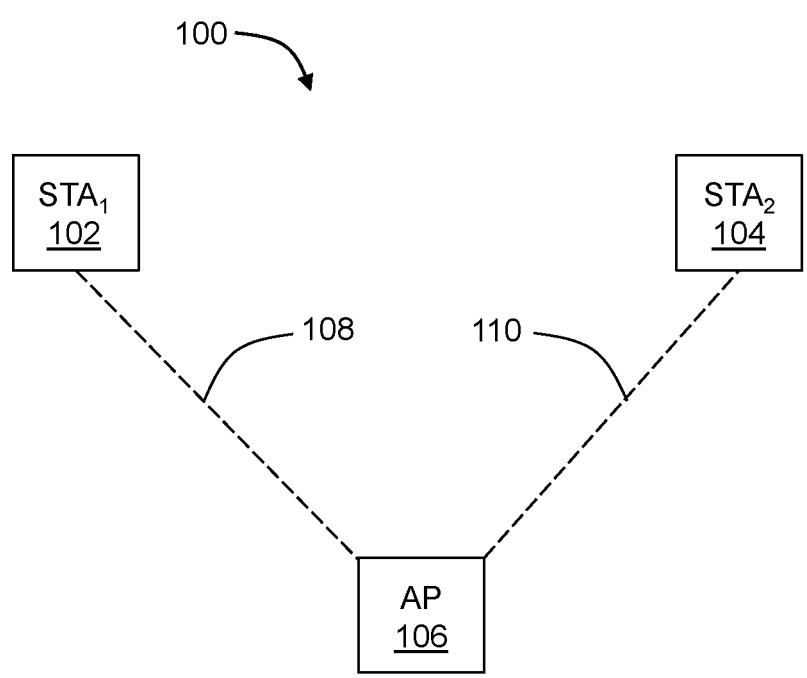
FIG. 1 illustrates an example operating environment that may implement early link detection based adaptive selection of receive parameters.

all arranged in accordance with at least one implementation described herein.

DETAILED DESCRIPTION OF SOME EXAMPLE IMPLEMENTATIONS

Implementations described herein may generally include early link detection based adaptive selection of receive parameters based on information that may be included in and/or determined from a pre-payload portion of a packet. The receive parameters may include baseband receive parameters and/or RF receive parameters and may be selected at a receiver node to improve reception of a payload of the packet relative to reception with other receive parameters.

In some other approaches, a packet with a frame that includes a MAC header is received. The frame, including the MAC header, is decoded. The link and/or source may be identified from the decoded MAC header.

In comparison, and according to some implementations described herein, the link and/or source may be identified before the MAC header is decoded, e.g., using the legacy preamble, receive directionality, and/or other pre-payload portion of the packet. After identifying the link and/or source of the packet, receive parameters associated with the link and/or source may be selected and loaded to receive a payload of the packet. By selecting and loading receive parameters that may be associated with particular links and/or sources to receive the payload, training can be reduced and/or avoided to improve system performance.

In some implementations, a signature may be determined based on the pre-payload portion of the packet to identify the link and/or the source. If the signature of the source suddenly changes, e.g., due to a man in the middle attack, a security event may be triggered. For instance, links for long-term static devices are expected to have signatures that remain static. When a signature of such a device changes suddenly, the change may be due to a man in the middle attack. A security event may be triggered in response to the change. Example security events include disassociating the source from a receiver node and generating and providing an alert to a network administrator.

In some implementations, a receiver node such as an access point (AP) or a wireless station (STA) may receive at least one of a preamble, a header, or other pre-payload portion of a packet. Based on information included in and/or determined from the pre-payload portion, one or more receive parameters may be selected and/or loaded at the receiver node. For example, a link associated with a sender node of the packet may be identified from the pre-payload portion and one or more baseband receive parameters associated with the identified link may be selected and loaded. Alternatively or additionally, one or more RF receive parameters may be selected based on the same or other information included in and/or determined from the pre-payload portion. The receiver node may then receive a payload of the packet using the one or more baseband and/or RF receive parameters.

Reference will now be made to the drawings to describe various aspects of example implementations of the invention. It is to be understood that the drawings are diagrammatic and schematic representations of such example implementations, and are not limiting of the present invention, nor are they necessarily drawn to scale.

FIG. 1 illustrates an example operating environment 100 that may implement early link detection based adaptive selection of receive parameters, arranged in accordance with at least one implementation described herein. The environment 100 includes multiple STAs, including a first STA$_1$ 102 and a second STA$_2$ 104, collectively referred to herein as STAs 102, 104. The environment 100 additionally includes an AP 106.

In general, the STAs 102, 104 and the AP 106 may be configured to communicate wirelessly with each other, including sending and receiving data packets. Each of the STAs 102, 104 and the AP may be considered a sender node when sending data or a receiver node when receiving data.

The AP 106 may include a gateway, a repeater, a mesh node, and/or other suitable access point for wireless stations or devices such as the STAs 102, 104. The AP 106 may connect to the Internet and/or a core network via a bridge, a backhaul link, a base station, and/or other suitable devices or connections.

Each of the STAs 102, 104 may generally include any device that has the capability to wirelessly connect to the AP 106 according to any of the IEEE 802.11 standards or other suitable wireless standard. Each of the STAs 102, 104 may include a desktop computer, a laptop computer, a tablet computer, a mobile phone, a smartphone, a personal digital assistant (PDA), a smart television, or any other suitable wireless station.

The first $STA_1$ 102 and the AP 106 may communicate with each other over a first link 108 or channel having first channel conditions. The second $STA_2$ 104 and the AP 106 may communicate with each other over a second link 110 or channel having second channel conditions. In an example, the second channel condition can be identified by the channel estimation from legacy preamble. The first channel conditions may be different than the second channel conditions.

In general, the AP 106 may have one or more idle state receive parameters when waiting to receive data from any STA, such as the STAs 102, 104, in a local area network (LAN) established by the AP 106 and/or of which the AP 106 is a part. The idle state receive parameters may be configured to reduce power consumption or improve omnidirectional coverage of the AP 106 or accomplish some other objective and as such may be ineffective or less effective than other receive parameters to receive data from the STAs. The idle state receive parameters may nevertheless be sufficient to, at a minimum, detect incoming data. The AP 106 may then select different receive parameters than the idle state receive parameters to receive the data from the STAs 102, 104. Further, because the first and second links 108, 110 have different channel conditions, receive parameters of the AP 106 that improve reception of data from the first $STA_1$ 102 may be different than the receive parameters of the AP 106 that improve the reception of data from the second $STA_2$ 104.

According to some implementations, when the AP 106 begins to receive a packet, the AP 106 may dynamically select one or more receive parameters to improve reception of a remainder, e.g., the payload, of the packet. If a packet burst is expected from either of the STAs 102, 104, the AP 106 may maintain the selected receive parameters until termination of the packet burst.

The receive parameters of the AP 106 may include baseband receive parameters and/or RF receive parameters. Baseband receive parameters may include automatic gain control (AGC) gain, equalizer type, interference rejection, filtering, or other baseband receive parameters. RF receive parameters may include antenna blocks or sectors, BF patterns, and/or antenna polarization.

According to some implementations, the AP 106 may select the one or more receive parameters based on information included in and/or derived from an early part of a packet. For example, the AP 106 may select the one or more receive parameters according to a link associated with a sender node (e.g., one of the STAs 102, 104) where the link and/or sender node is identified from the information included in and/or derived from a preamble, a header, or another pre-payload portion of the packet. The AP 106 may then load the selected receive parameters or otherwise configure itself according to the selected receive parameters to receive the payload of the packet using the selected receive parameters. The selected receive parameters may improve reception compared to the idle state receive parameters and/or other receive parameters.

Figure 2:
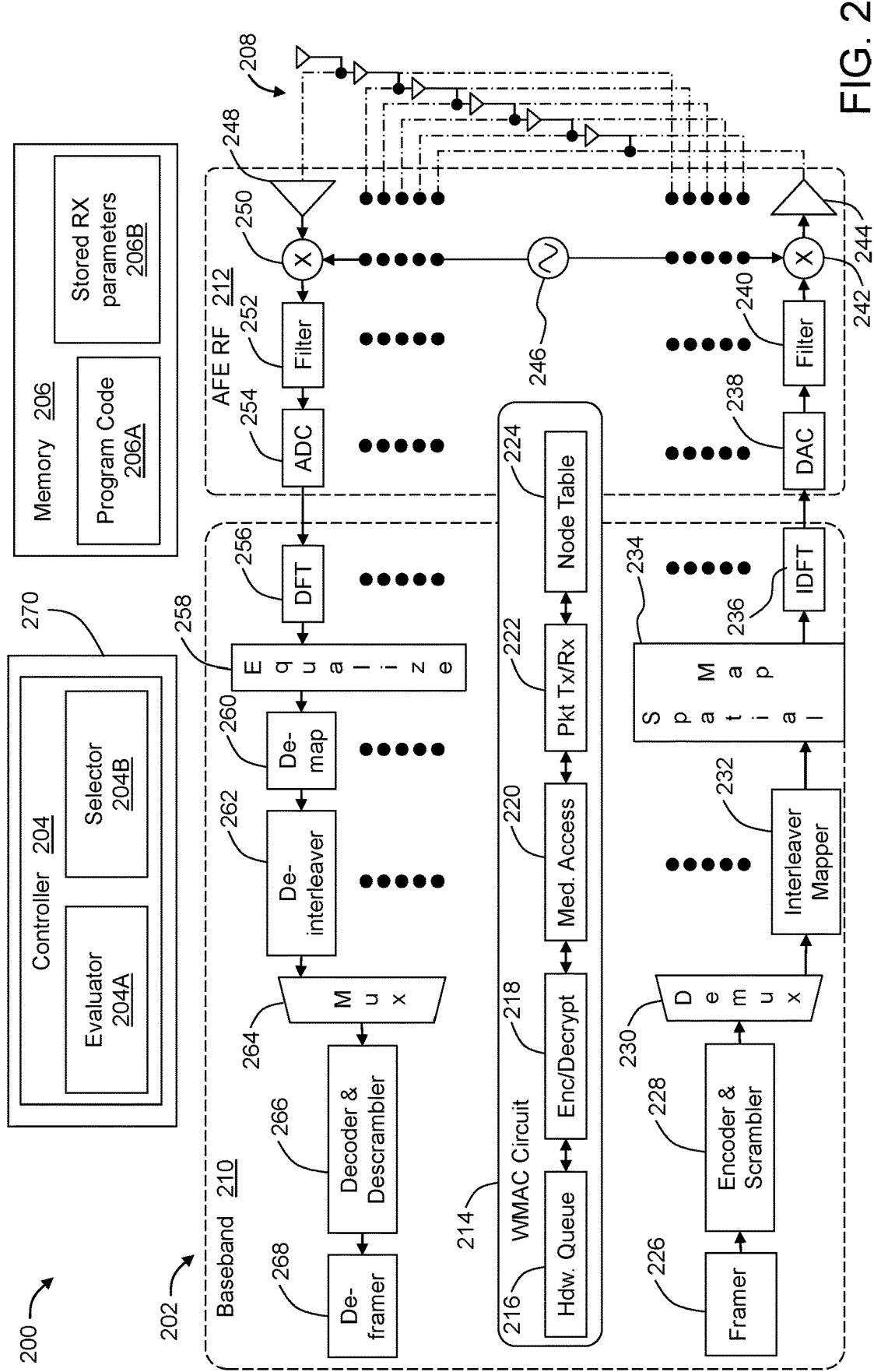
FIG. 2 is a block diagram of an example transceiver that may implement early link detection based adaptive selection of receive parameters.

FIG. 2 is a block diagram of an example transceiver 200 that may implement early link detection based adaptive selection of receive parameters, arranged in accordance with at least one embodiment described herein. The transceiver 200 may be operable as an AP or a station and thus may be a sender and/or a receiver. In general, the transceiver 200 may include a WiFi stage 202, a controller 204, and a non-volatile memory 206.

The WiFi stage 202 may generally include multiple shared and discrete components which make up various transmit and receive chains coupled to one or more antennas 208. The transceiver 200 is specifically illustrated as a 6×6 multiple-input multiple-output (MIMO) AP that supports as many as 6 discrete communication streams over six antennas 208. Alternatively, the transceiver 200 may include any number of antennas (e.g., 2×2, 4×4, 5×5, . . . , 16×16, etc). More generally, the transceiver 200 may include any suitable number of antennas 208 in any suitable arrangement such as MIMO, single-input single-output (SISO), single-input multiple-output (SIMO), or multiple-input single-output (MISO).

Although not illustrated in FIG. 2, the transceiver 200 may couple via an integral modem to one of a cable, a fiber, or a digital subscriber backbone connection to, e.g., the Internet. A packet bus (not illustrated in FIG. 2) may couple the modem to the WiFi stage 202. The WiFi stage 202 supports wireless communications, e.g. IEEE 802.11 compliant communications, on a WLAN (not illustrated in FIG. 2). As illustrated in FIG. 2, the WiFi stage includes a baseband circuit 210, an analog front end (AFE) and RF circuit 212, and the antennas 208.

In the baseband circuit 210, wireless communications transmitted to or received from each user/client/station are processed. The AFE and RF circuit 212 handles the upconversion on each transmit chain or path of wireless transmissions initiated in the baseband. The AFE and RF circuit 212 also handles the downconversion of signals received on the receive chains or paths and passes them for further processing to the baseband circuit 210.

Each transmit chain/path may include one or more of the following discrete and shared components. Data to be transmitted on the packet bus is initially processed by a WiFi medium access control (WMAC) circuit 214. The WMAC circuit 214 includes hardware queues 216 for each downlink and uplink communication stream; an encryption and decryption circuit 218 to encrypt and decrypt the downlink and uplink communication streams; a medium access circuit 220 to make the clear channel assessment (CCA), and to make exponential random backoff and re-transmission decisions; and a packet processor circuit 222 for packet processing of the transmitted and received communication streams. The WMAC circuit 214 may have access to a node table 224 which lists each node/station on the WLAN, the station's capabilities, each corresponding encryption key, and/or a priority associated with its communication traffic.

Each sounding packet or data packet for wireless transmission on the transmit chain components to one or more stations is framed in a framer 226. Next each stream is encoded and scrambled in an encoder and scrambler 228 followed by demultiplexing in a demultiplexer 230 into separate streams. Next, streams are subject to interleaving and mapping in a corresponding one of multiple interleaver mappers 232. A single interleaver mapper 232 is illustrated in FIG. 2, with a series of five dots above the interleaver mapper 232 representing five replicate interleaver mappers 232 (e.g., for a total of six interleaver mappers 232 including one in each transmit chain in this example). Other components in FIG. 2 are similarly designated as having replicates by various series of dots.

Following interleaving and mapping, all transmissions are spatially mapped in a spatial mapper 234. The spatially mapped streams from the spatial mapper 234 are input to Inverse Discrete Fourier Transform (IDFT) circuits 236 for conversion from the frequency to the time domain and subsequent transmission in the AFE and RF circuit 212.

Each IDFT circuit 236 is coupled to a corresponding transmit chain/path in the AFE RF circuit 212. Specifically, each IDFT circuit 236 couples to a corresponding digital-to-analog converter (DAC) 238 to convert the digital transmission to analog, a corresponding filter 240, a corresponding upconverter 242, and a corresponding power amplifier 244. Each filter 240 may include a bandpass filter or other suitable filter. Each upconverter 242 is coupled to a common voltage-controlled oscillator (VCO) 246 to upconvert the transmission to an appropriate center frequency of a selected channel. Each power amplifier 244 may set a transmit power level of the transmission on the corresponding antenna 208.

Each receive chain/path in the AFE RF circuit 212 may include one or more of the following discrete and shared components. Received communications on the antennas 208 are subject to RF processing including downconversion in the AFE RF circuit 212. There are six receive paths in the illustrated implementation, each including one or more of the following discrete and shared components: a low noise amplifier (LNA) 248 to amplify the received signal under control of an AGC (not illustrated in FIG. 2) to set an amount by which the received signal is amplified, a downconverter 250 coupled to the VCO 246 to downconvert the received signal, a filter 252, e.g., to bandpass filter the received signal, and an analog-to-digital converter (ADC) 254 to digitize the downconverted signal. The digital output from each ADC 254 is passed to a corresponding discrete Fourier transform (DFT) circuit 256 in the baseband circuit 210 of the WiFi stage 200 to convert from the time to the frequency domain.

A value of the AGC is an example of a baseband receive parameter that may be dynamically selected based on the pre-payload portion of packets as described herein. A voltage of each received signal output by the antennas 208 to the LNAs 248 may depend on, e.g., transmission distance from the sender node to the transceiver 200. The bit resolution of each ADC 254 may depend on a voltage range of the signal received from the corresponding LNA 248 via the corresponding downcoverter 250 and filter 252; signals with a full voltage range of the ADCs 254 may have better bit resolution. The AGC may control gain of the LNAs 248 to output analog signals with voltages in the full range of the ADCs 254. Accordingly, implementations described herein may include early identification of the link and/or sender node of the packet based on the pre-payload portion of the packet and selection and loading of an appropriate AGC to receive the payload of the packet.

Receive processing in the baseband circuit 210 may include one or more of the following shared and discrete components. First, an equalizer 258 is coupled to the output of the DFT 256 to mitigate channel impairments. The received WiFi streams at the output of the equalizer 258 are subject to demapping and deinterleaving in a corresponding demapper 260 and deinterleaver 262. Next, the received streams are multiplexed in multiplexer 264 and decoded and descrambled in a decoder and descrambler 266, followed by de-framing in a deframer 268. The received communication is then passed to the WMAC circuit 214 where it is decrypted with the encryption and decryption circuit 218 and placed in the appropriate upstream hardware queue 216 for upload to the Internet.

The equalizer 258 may be dynamically reconfigurable between different equalizer types based on information included in and/or determined from a pre-payload portion of packets received at one or more of the antennas 208. Alternatively or additionally, the WiFi stage 202 may include multiple different types of equalizers 258 that are switchable into and out of the receive chains/paths based on such information. A given equalizer type 258 may be selectable based on the particular link and/or sender node of a packet determined based on information included in and/or determined from the pre-payload portion; a given link and/or sender node may implement a particular modulation and coding scheme (MCS) or other parameters that warrant an equalizer type with an accuracy level that meets or exceeds a particular threshold. In equalizers, there is typically a tradeoff between accuracy and resources (e.g., time and/or power): simple equalizers with lower performance (e.g., rate, capacity, etc.) are typically less resource-intensive than more complex equalizers with higher accuracy. Accordingly, implementations described herein may include early identification of the link and/or sender node of the packet based on the pre-payload portion of the packet and selection and loading of an appropriate equalizer type or other baseband receive parameter to adequately receive the payload of the packet while minimizing resource consumption.

Each of the antennas 208 may include a single antenna with one or more sectors, or multiple antennas each with one or more sectors. One or more of the antennas 208 may be steerable and/or may be or include a directional antenna. In an example implementation, each of the antennas 208 is an electronically steerable antenna (ESA). Various types of antenna are suitable for this purpose, such as patch antennas, phased arrays, and Yagi antennas. The antennas 208 may each include a driven element and one or more parasitic elements. The directionality of each of the antennas 208 may be achieved by controlling impedance of the parasitic elements of each of the antennas 208 using a corresponding antenna driver (not illustrated in FIG. 2). Each antenna driver may set the impedance of the parasitic elements of each antenna 208 to spatially shape an RF footprint, e.g., directionality, of each antenna 208. In an example, each of the antennas 208 may be configurable between various RF footprints or coverage patterns, including an omni receive configuration with relatively greater coverage and relatively lower directional gain, a coarse quasi-omni receive configuration with medium coverage and medium directional gain, and a fine receive configuration with relatively lower coverage and relatively greater directional gain.

In some implementations, during an idle state, a first subset of the antennas 208 or antenna sectors may be operated while remaining antennas 208 or antenna sectors are off. A packet may be detected based on a pre-payload portion of the packet by the first subset of antennas or antenna sectors in operation, e.g., by detecting OTA energy in excess of an energy threshold. After the packet is detected, a selector 204B included in the control 204 can turn on or activate the remaining antennas 208 and a metric or other information may be extracted or determined from the pre-payload portion of the packet for each of the antennas 208 or antenna sectors. A second subset of the antennas 208 or antenna sectors that has a better metric than others may then remain on to receive a payload of the packet while the others are turned off. Alternatively or additionally, a link and/or a sender node of the packet may be identified, and a corresponding RX BF pattern may be applied at the second subset of the antennas 208 or antenna sectors to receive the payload. The subset of antennas 208 and/or antenna sectors and/or the RX BF pattern that is selected to receive the payload are examples of RF receive parameters that may be dynamically selected based on the pre-payload portion of packets as described herein.

In an example implementation, the controller 204 may be instantiated by a processor device 270 executing program code 206A stored on the non-volatile memory 204. The controller 204 may generally be configured to control the transceiver 200 to implement early link detection based adaptive selection of receive parameters as described herein.

The controller 204 may include an evaluator 204A that evaluates a pre-payload portion of packets to identify a link over which the packet is received and/or to identify a sender of the packet based on information included in or determined from the pre-payload portion. Alternatively or additionally, the evaluator 204A may detect and/or evaluate OTA energy from the pre-payload portion of packets to detect arrival of packets at the transceiver 200. Alternatively or additionally, the evaluator 204A may evaluate other information that is included in or determined from the pre-payload portion of the packets. The evaluator 204A or another component of the controller 204 may extract or determine the information from the pre-payload portion of the packet which is evaluated. The extracted or determined information may include one or more of OTA energy, channel state information (CSI), received signal state indicator (RSSI), or other information.

The controller 204 may additionally include the selector 204B that selects one or more receive parameters based on the information included in, extracted from, and/or determined from the pre-payload portion of the packets. Some receive parameters may be associated with a particular link and/or sender node. Accordingly, after identifying the link or sender node of the packet based on the pre-payload portion, the receive parameters associated with the link or node may be selected and loaded at the transceiver 200 and/or the transceiver 200 may otherwise configure itself with the selected receive parameters to receive the payload of the packet. Some examples of receive parameters that may be associated with a particular sender node or link may include baseband receive parameters such as AGC gain, equalizer type, interference rejection, filtering, or other baseband receive parameters, and/or RF receive parameters such as RX BF pattern. In these and other implementations, the non-volatile memory 206 may include stored receive parameters 206B that may be associated with particular links and/or sender nodes. By selecting and loading receive parameters associated with the identified link or sender node after identifying the link or node, training can be reduced and/or avoided to improve system performance.

Some receive parameters may not be associated with a particular link and/or sender node and/or may be determined without identifying the particular link and/or sender node of the packet. Some examples of such receive parameters may include RF receive parameters such as antenna sector and antenna polarization.

Figure 3A:
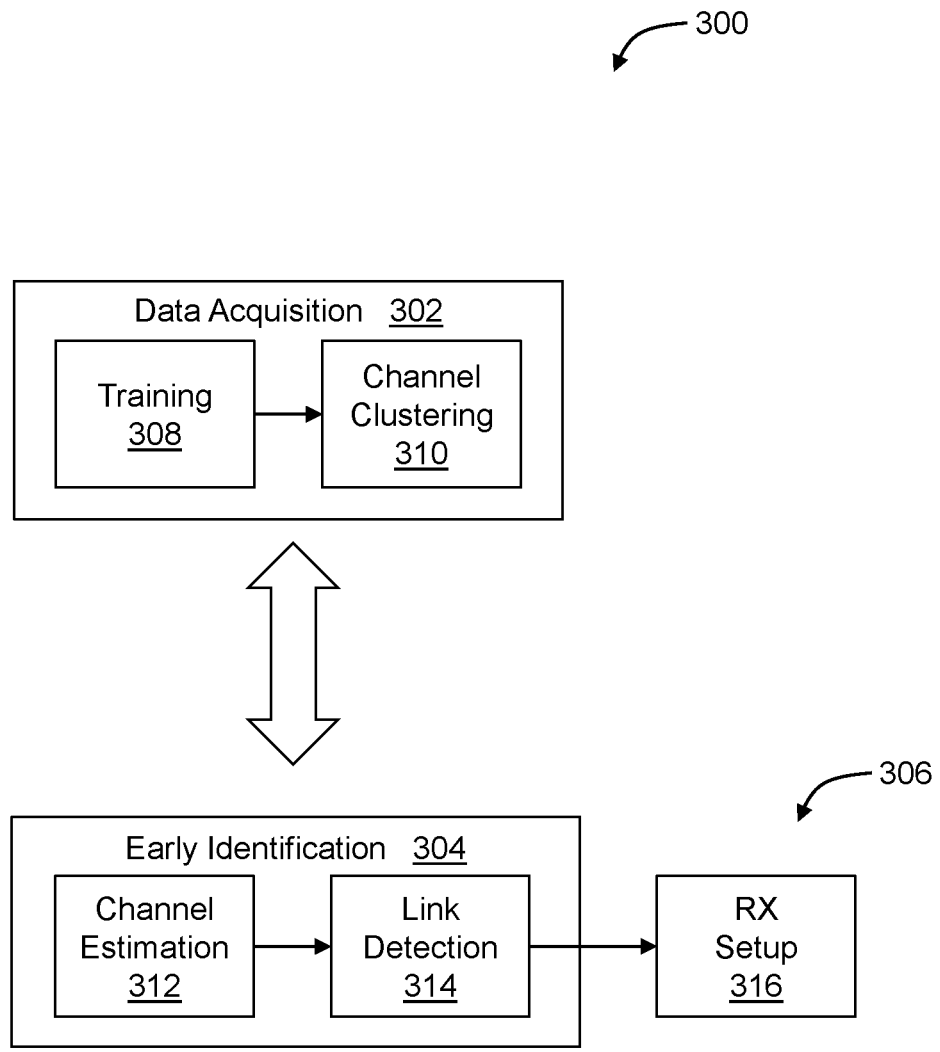
FIG. 3A is a flowchart of an example method of early link detection.

FIG. 3A is a flowchart of an example method 300 of early link detection, arranged in accordance with at least one implementation described herein. The method 300 may include or be included in methods of early link detection based adaptive selection of receive parameters. The method 300 may be implemented, in whole or in part, by one or more of the first $STA_1$ 102, the second $STA_2$ 104, the AP 106, and/or the transceiver 200, and more generally by a receiver node that receives packets from a sender node. Alternatively or additionally, execution of the controller 204 by the processor device 270 may cause the processor device 270 to perform or control performance of one or more of the operations or blocks of the method 300.

The method 300 may include one or more of a data acquisition phase 302, an early identification phase 304, and a payload receive phase 306. The data acquisition phase 302 may include one or more of a training block 308 and a channel clustering block 310. The early identification phase 304 may include one or more of a channel estimation block 312 and a link detection block 314. The payload receive phase 306 may include an RX setup block 316.

The data acquisition phase 302 may generally involve training and clustering to generate a historic signature for each of one or more links and/or sender nodes to be used subsequently in the early identification phase. For example, the access point can periodically sound all the associated STAs to collect channel estimates. The periodicity can be a function of a rate of change in the channel between the AP and corresponding STA. The estimates can be clustered to form distinguishable groups which are used in the identification process.

In the training block 308, a receiver node determines and collects an estimated channel, CSI, RSSI, OTA energy, and/or other metric from and/or based on a header or other pre-payload portion of packets received from one or more sender nodes and tracks them over time (e.g., interval, cycles, etc.).

In the channel clustering block 310, the collected channel state or other metric across available subcarriers for each link and/or sender node is clustered and the AP generates and updates a per-link signature from the collected channel state or other metric, which may be referred to as a historic signature. In this and other implementations, a source address, such as a MAC source address, or other sender-specific or link-specific information from the packets received during training may be used to associate the collected metrics with the corresponding sender node and/or link during clustering. Each cluster may identify and/or be associated with a corresponding link and/or sender node.

The early identification phase 304 may generally include identifying a particular link and/or sender node of a new packet based on a pre-payload portion of the packet. For example, the estimated channel is correlated with the existing historical signatures derived from the clustered channels. The clustered channel with the maximum correlation can be used to identify the link. In an example implementation, the AP may fall back to a non-early detection method in response to determining the clustered group with the maximum correlation includes two or more stations.

In the channel estimation block 312, for every packet, channel state or other metric is estimated or otherwise determined from a legacy header portion of the packet or other pre-payload portion of the packet received at the receiver node. For example, CSI may be extracted from the legacy header portion and an H matrix may be estimated from the CSI. The receiver node may use one or more idle state receive parameters to receive the pre-payload portion of the packet.

In the link detection block 314, the current CSI or other metric or a signature derived therefrom for each packet may be correlated with the historic CSI or other metric or signature of existing clusters. A distance metric may be calculated of the current CSI, other metric, or signature from each historic CSI, other metric, or signature of the existing clusters; the link or sender node associated with the cluster with the historic CSI, other metric, or signature that is closest to the current CSI, other metric, or signature may be identified as the link and/or sender node of the packet.

The payload receive phase 306 may generally include selecting and loading one or more receive parameters that may be associated with and/or optimized for the identified link and/or sender node to receive the payload of the packet. In more detail, at the RX setup block 316, the receiver node may select one or more receive parameters associated with the identified link and/or node from the link detection block 314. In the payload receive phase 306, the receiver node may also load the selected receive parameters and/or otherwise configure itself with the selected receive parameters, which may be different than the idle state receive parameters. In the payload receive phase 306, the receiver node may also receive the payload of the packet using the selected receive parameters.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 3B:
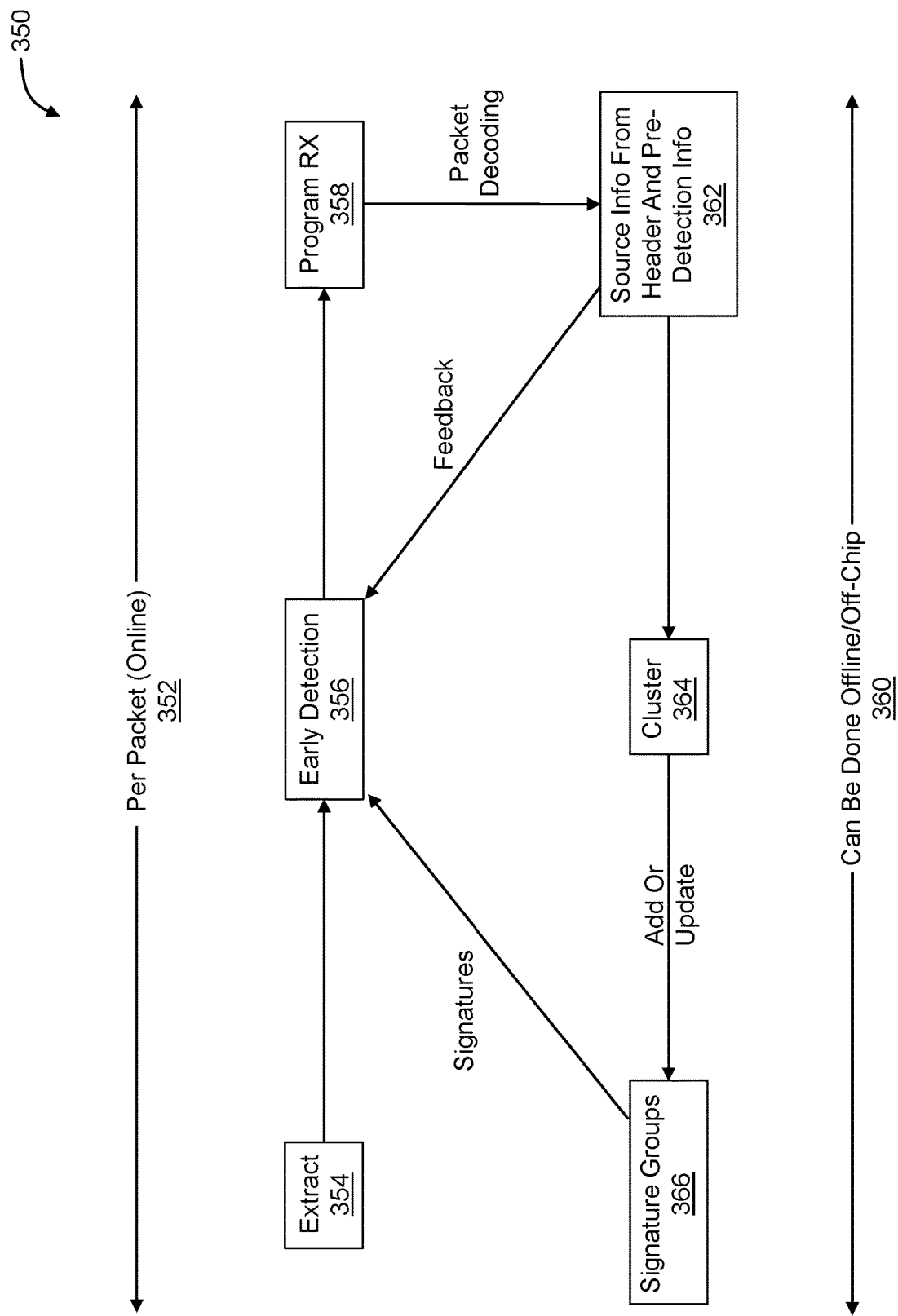
FIG. 3B is a flowchart of an example method of packet processing.

FIG. 3B is a flowchart of an example method 350 of packet processing, arranged in accordance with at least one implementation described herein. The method 350 may include or be included in methods of early link detection based adaptive selection of receive parameters. The method 350 may be implemented, in whole or in part, by one or more of the first $STA_1$ 102, the second $STA_2$ 104, the AP 106, and/or the transceiver 200, and more generally by a receiver node that receives packets from a sender node and/or by a node that is coupled to process packets received at the receiver node from the sender node. Alternatively or additionally, execution of the controller 204 by the processor device 270 may cause the processor device 270 to perform or control performance of one or more of the operations or blocks of the method 350.

As indicated at 352, the method 350 may include various operations or blocks 354, 356, and/or 358 that may be performed on a per packet basis and online, e.g., as packets are received. In some implementations, the blocks 354, 356, 358 may respectively include, be included in, and/or correspond to the channel estimation block 312, the link detection block 314, and the receiver setup block 316 of FIG. 3A.

As indicated at 360, the method 350 may include various operations or blocks 362, 364, 368 that may be performed offline and/or off-chip. Alternatively or additionally, one or more of the blocks 362, 364, 368 may be performed online and/or on-chip. In some implementations, the blocks 362, 364, 366 may include, be included in, and/or correspond to the data acquisition block 302 of FIG. 3A.

Block 354 may include extracting or otherwise deriving or determining CSI and/or other information from a pre-payload portion of each packet received from one or more sender nodes at a receiver node. Block 354 may be followed by block 356.

Block 356 may include early detection 356 (e.g., before decoding the packet) of the link and/or source (e.g., sender node) of each packet at the receiver node. Block 356 may be followed by block 358.

Block 358 may include programming the receiver node to receive the payload of each packet using one or more receive parameters selected based on the identified link and/or source.

In some implementations, early detection of the link and/or source of a packet at block 356 may fail and the receiver node may be programmed at block 358 to receive the payload using one or more default receive parameters.

Each packet may be decoded as it is received. Source information of each received packet (e.g., the source or sender node) may be determined from the decoded header and/or pre-detection information (e.g., CSI or other information that may be extracted or otherwise determined prior to decoding of each packet) may be determined for each packet at block 362. Feedback based on the source information and/or pre-detection information determined from the decoded packets may be returned to block 356 for use in early detection for subsequent packets. Block 362 may be followed by block 364.

Block 364 may include clustering channel state or other metric (e.g., pre-detection information) across available subcarriers for each link and/or sender node using the information determined at block 362 to generate and/or update signatures groups 366. The signatures may be used in block 356 for early detection of the link and/or source of packets received from sender nodes as generally described elsewhere herein. For example, a signature of a packet determined from information extracted or derived from the pre-payload portion of the packet at block 354 may be compared to or correlated with the signature groups 366 at block 356 to identify a corresponding link and/or source of the packet.

Figure 4A:
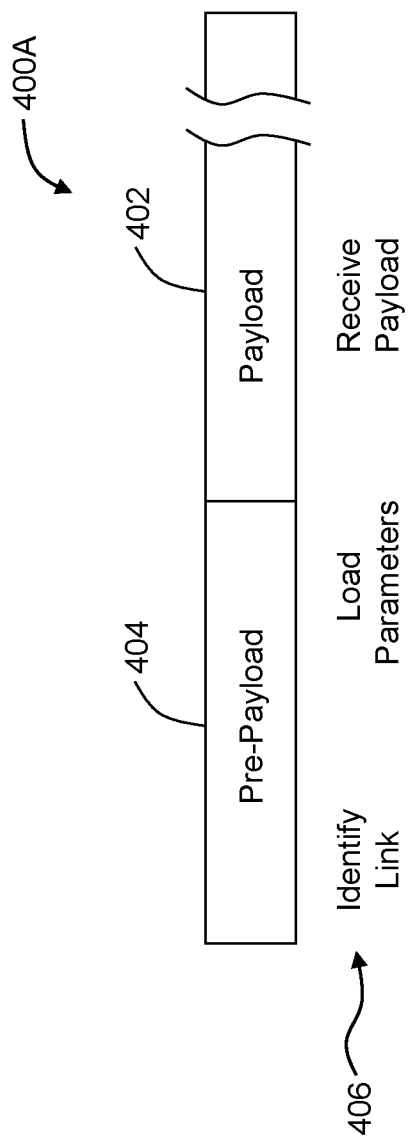
FIG. 4A is a packet diagram of an example wireless user data packet.

FIG. 4A is a packet diagram of an example wireless user data packet 400A (hereinafter packet 400A), arranged in accordance with at least one implementation described herein. The packet 400A includes a payload 402 preceded by a pre-payload portion 404. The payload 402 includes uplink or downlink user data. The pre-payload portion 404 may include a preamble, a header, or other information that precedes the payload 402.

FIG. 4A further illustrates timing of an example implementation of the method 300 of FIG. 3A relative to reception of the packet, the example implementation of the method 300 designated in FIG. 4A as method 406. As illustrated, the method 406 may include identifying the link and/or sender node of the packet 400A early in the reception of the packet 400A, such as during the reception of a preamble and/or a header of the pre-payload portion of the packet 400A. This may include and/or be included in the early identification phase 304 of FIG. 3A. The method 406 may also include selecting and/or loading one or more receive parameters at a receiver node of the packet 400A early in the reception of the packet 400A and after identifying the link, and thereafter receiving the payload 402 using the selected receive parameters at the receiver node. The selection and loading of the receive parameters and the reception of the payload 402 may include and/or be included in the payload receive phase 306 of FIG. 3A.

Figure 4B:
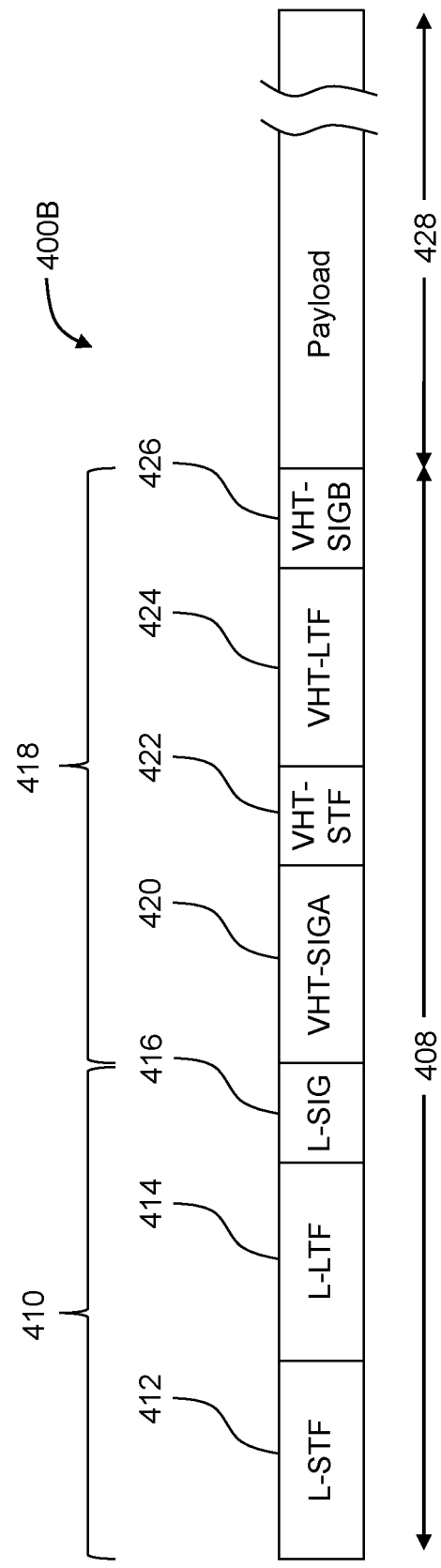
FIG. 4B is a packet diagram of an example wireless user data packet with an expanded header.

FIG. 4B is a packet diagram of another example wireless user data packet 400B (hereinafter packet 400B), arranged in accordance with at least one implementation described herein. In the example of FIG. 4B, the packet 400B may specifically include, in the IEEE 802.11 parlance, a Physical Layer Convergence Protocol (PLCP) Protocol Data Unit (PPDU). The packet 400B may include one or more WLAN packet headers that may include various preamble fields with known sequences which allow a receiver node to synchronize reception with packet boundaries and to determine the received channel. One such header is designated at 408 in FIG. 4B, hereinafter header 408.

The header 408 includes a legacy portion 410 containing a legacy-short training field (L-STF) 412, a legacy-long training field (L-LTF) 414, and a legacy-signal (L-SIG) field 416. The header 408 also contains a very high throughput (VHT) portion 418 containing a VHT-signal A (VHT-SIGA) field 420, a VHT-short training field (VHT-STF) 422, a VHT-long training field (VHT-LTF) 424, and a VHT-signal B (VHT-SIG-B) field 426. The L-LTF field 414, the L-STF field 412, and the L-SIG field 416 are compatible with stations that support only the IEEE 802.11n or earlier standards. The remaining signal and training fields, e.g., in the VHT portion 418, are intended only for very high throughput, e.g. IEEE 802.11ac/ax compliant devices. The VHT-SIGA field 420 may contain information on the MCS and number of streams of the sounding. The VHT-STF field 422 may be used for AGC. The VHT-LTF field 424, a.k.a. channel estimation or sounding field, may contain a long training sequence used for MIMO channel estimation by the receiver node.

The packet 400B additionally includes a payload 428. The payload 428 of the packet 400B contains uplink or downlink user data.

Relevant IEEE standards specify use of the L-LTF field 414 for channel estimation. Zero-forcing or other relevant technique may be applied to the L-LTF field 414 to extract an H matrix of the channel to estimate the channel. In some implementations, the L-LTF field 414 may include a known signal. Channel estimation may include dividing the received signal by the known signal to identify the H matrix.

Some implementations described herein may additionally use the L-LTF field 414 or other pre-payload portion of the packet 400B to identify the link and/or sender node of the packet 400B. In particular, the channel estimate, H matrix, or other information extracted and/or otherwise determined from the L-LTF field 414 may be used as a signature which can be compared to or correlated with historic signatures of other links and/or sender nodes as described elsewhere herein. After identification of the link and/or sender node of the packet 400B, receive parameters associated with the link and/or sender node may then be selected and used to receive the payload 428 of the packet 400B without doing accurate parameter estimation for each packet.

Figure 5:
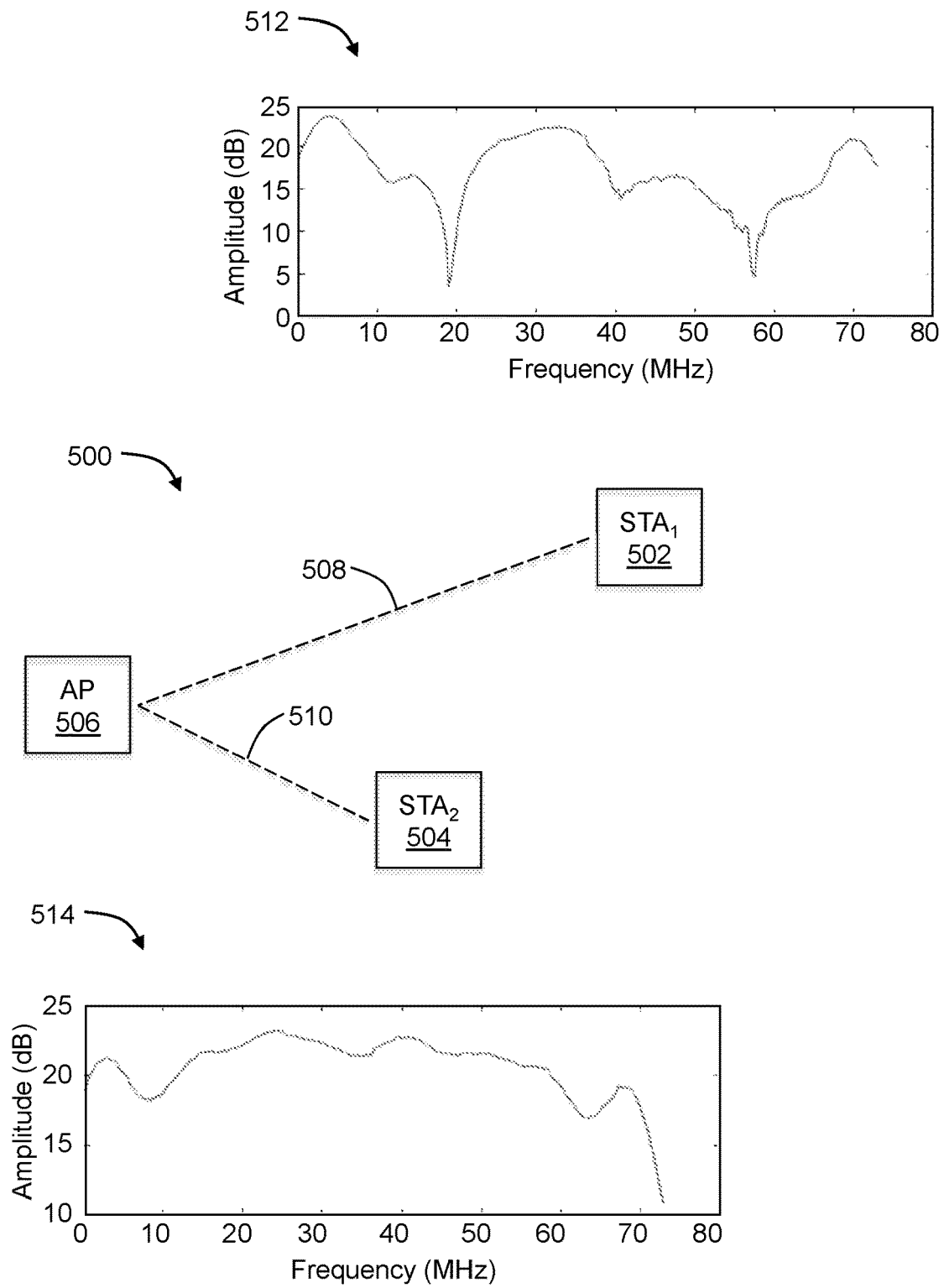
FIG. 5 illustrates another example operating environment that may implement early link detection based adaptive selection of receive parameters based on an estimated channel.

FIG. 5 illustrates another example operating environment 500 that may implement early link detection based adaptive selection of receive parameters, arranged in accordance with at least one implementation described herein. The environment 500 includes multiple STAs, including a first $STA_1$ 502 and a second $STA_2$ 504, collectively referred to herein as STAs 502, 504. The environment 500 additionally includes an AP 506. The STAs 502, 504 and the AP 506 may respectively include or correspond to the STAs 102, 104 and the AP 106 of FIG. 1.

The first $STA_1$ 502 and the AP 506 may communicate with each other over a first link 508 or channel having first channel conditions. The second $STA_2$ 504 and the AP 506 may communicate with each other over a second link 510 or channel having second channel conditions. The first channel conditions may be different than the second channel conditions.

FIG. 5 additionally illustrates graphical representations 512, 514 of example channel responses of the first link 508 and the second link 510. In particular, the graphical representation 512 is an example channel response of the first link 508 while the graphical representation 514 is an example channel response of the second link 510. Each of the graphical representations 512, 514 may represent an historical channel response and/or signature of the corresponding first or second link 508 such as may be determined at the channel clustering block 310 of FIG. 3A, 510 or a current channel response and/or signature such as may be determined at the channel estimation block 312 of FIG. 3A.

As can be seen from the graphical representation 512 of FIG. 5, a signature of the first link 508 may include two frequency dips in this example, e.g., a first frequency dip at about 20 megahertz (MHz) and a second frequency dip at about 58 MHz. As can be seen from the graphical representation 514, a signature of the second link 510 may include a frequency dip at about 73 MHz in this example.

Figure 6:
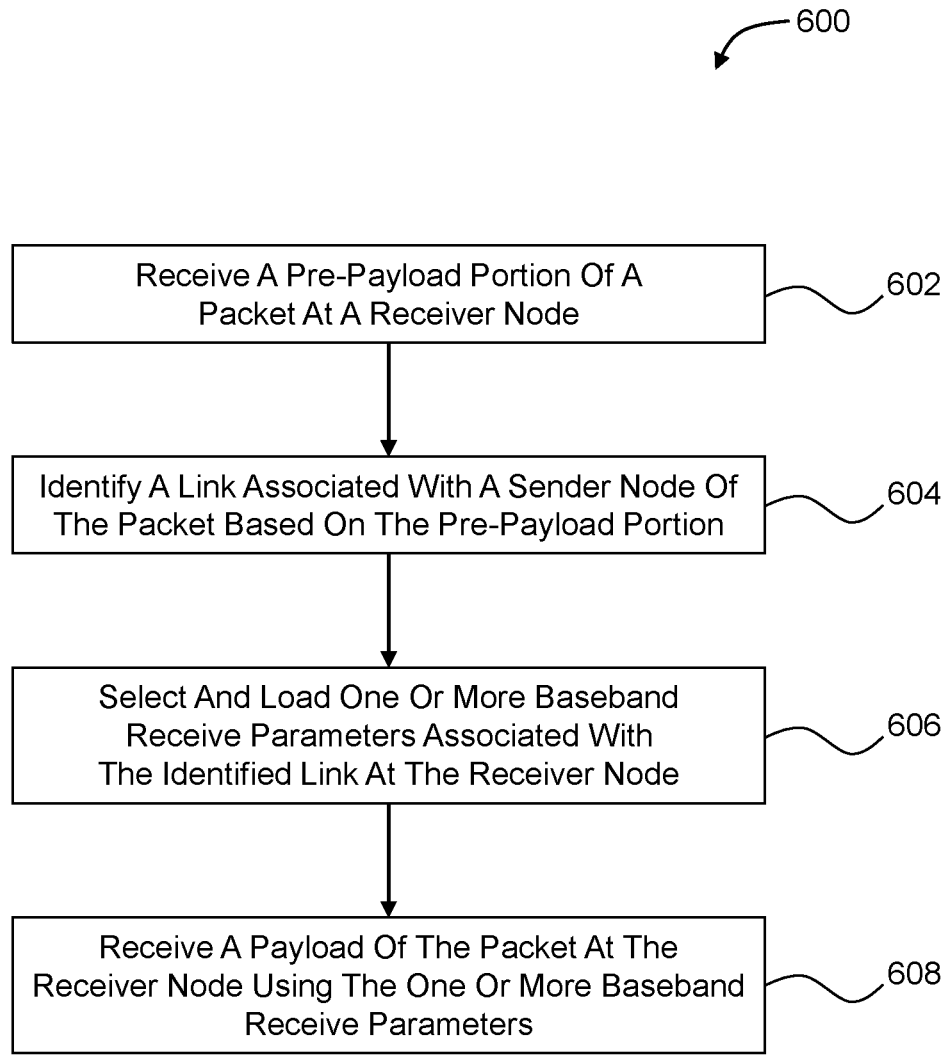
FIG. 6 is a flowchart of another example method of early link detection.

FIG. 6 is a flowchart of another example method 600 of early link detection, arranged in accordance with at least one implementation described herein. The method 600 may include or be included in methods of early link detection based adaptive selection of receive parameters. The method 600 may be implemented, in whole or in part, by one or more of the first $STA_1$ 102, the second $STA_2$ 104, the AP 106, and/or the transceiver 200, and more generally by a receiver node that receives packets from a sender node. Alternatively or additionally, execution of the controller 204 by the processor device 270 may cause the processor device 270 to perform or control performance of one or more of the operations or blocks of the method 600. Alternatively or additionally, some or all of the method 600 may include or be included in the method 300, or vice versa.

At block 602, the method 600 may include receiving a pre-payload portion of a packet at a receiver node. The receiver node may include the 106 AP, the STA 102, 104, the transceiver 200, or other suitable receiver node. The pre-payload portion may include a preamble, a header, or other information that precedes the payload 402, such as the pre-payload portion 404 of the packet 400A of FIG. 4A, or one or more of the fields 412, 414, 416, 420, 422, 424, 426 in the header 408 of the packet 400B of FIG. 4B. Block 602 may be followed by block 604.

At block 604, the method 600 may include identifying a link associated with a sender node of the packet and/or identifying the sender node based on the pre-payload portion of the packet. Identifying the link may include determining and/or extracting information from the pre-payload portion, such as estimated channel, CSI, RSSI, OTA energy, and/or other metric. Block 604 may be followed by block 606.

At block 606, the method 600 may include selecting and loading one or more baseband receive parameters associated with the identified link at the receiver node. In some implementations, loading the one or more baseband receive parameters at the receiver node may include configuring a baseband circuit of the receiver node with at least one of a specific automatic gain control (AGC) gain. a specific equalizer type, a specific interference rejection, specific filtering, or other specific baseband receive parameter. Block 606 may be followed by block 608.

At block 608, the method 600 may include receiving a payload of the packet at the receiver node using the selected baseband receive parameters. Receiving the payload using the selected baseband receive parameters may improve performance compared to receiving the payload using other baseband receive parameters, such as using idle state baseband receive parameters or other parameters that have not been optimized for the identified link or sender node. In an example implementation, the receiver node can also continue to operate parallelly in other directions that do not interfere with the current receive frame; thus providing improved spectral efficiency.

In an example implementation, identifying the link based on the pre-payload portion at block 604 may include extracting current CSI or other metric from the pre-payload portion. For example, the CSI can be extracted from the L-LTF portion of the packet preamble. Extracting the current CSI may include estimating an H matrix of the identified link. In another example, the method 600 can use metrics that include parameters extracted from the L-STF.

Identifying the link based on the pre-payload portion at block 604 may further include determining a current signature of the current CSI. For example, a decimated and quantified channel impulse response can be used as a signature.

Identifying the link based on the pre-payload portion at block 604 may further include correlating the current signature against a historic signature of each of one or more links that include the identified link. Correlating the current signature against the historic signature of each of the links may include calculating a distance metric (e.g., KL distance, correlation coefficient, normalized, Euclidian, quantized Manhattan) between the current signature and the historic signature of each of the links and selecting a link with a historic signature that is closest to the current signature as the identified link.

The historic signatures may be generated at one or more different devices than the device that performs the method 600. For example, a different device may generate the historic signatures, which historic signatures may then be loaded onto the receiver node or otherwise made accessible to the receiver node to perform the method 600.

Alternatively or additionally, the method 600 may include the receiver node generating the historic signatures. Generating the historic signatures of each of the links may include extracting over time CSI or other metric of each of the links from packets sent to the receiver node over each of the links. Generating the historic signatures may also include clustering the extracted CSI for each of the links based on one or more source addresses or other identifiers included in the packets, each of the source addresses or other identifiers identifying a corresponding one of one or more sender nodes that include the sender node. Generating the historic signatures may also include deriving the historic signature of each of the links from the clustered extracted CSI of each of the links.

In some implementations, after receiving the payload of the packet at the receiver node, the method 600 may further include determining that the current signature of the identified link has changed and does not correlate to a historic signature of the identified link. The method 600 may also include triggering a security event in response to determining that the current signature of the identified link has changed and does not correlate to the historic signature of the identified link. For example, a sudden change in signature can be detected and used as a factor to indicate a man in the middle attack. Triggering such security events may be done, e.g., for links that may be expected to be long-term static links, such as links between an AP and a wireless television or other typically long-term static devices. Triggering the security event may include disassociating the sender node from the receiver node, generating and providing an alert to a network administrator, or some other security event.

In an implementation, the receiver node includes a STA. The STA may track the channel signature of the associated AP. The STA may keep the channel signatures of multiple APs it has observed from beacons, probe responses, etc. The STA may then correlate a current channel signature against multiple observed channel signatures to identify a specific AP or link and select and load one or more receive parameters based on the identified AP.

In an implementation, the current packet's signature may be correlated against historic signatures by decimating or extrapolating on the subcarriers if the bandwidth of the current packet does not correlate to the bandwidth of the historic signatures. For example, suppose the sender node has modified its bandwidth from 80 MHz to 40 MHz. In this example, when looking for a correlation, the receiver node may correlate the channel signature against the corresponding 40 MHz in the historic signatures as opposed to the entire 80 MHz.

In an implementation, information determined and/or derived at the receiver node according to this and/or other methods described herein may be used to guide transmission of data from the receiver node to the sender node. For example, channel is generally reciprocal; that is, the channel from the sender node to the receiver node (hereinafter the "sender-to-receiver channel") may generally be reciprocal to the channel from the receiver node to the sender node (hereinafter the "receiver-to-sender channel"). Accordingly, CSI and/or other information about the sender-to-receiver channel that is determined and/or derived at the receiver node according to the methods described herein may be used to guide transmissions for the receiver-to-sender channel. For example, the receiver node may configure beamforming, antenna state, and/or other transmission parameters to send data to the sender node over the receiver-to-sender channel according to the CSI and/or other information determined and/or derived at the receiver node for the sender-to-receiver channel. In cases where the CSI and/or other information for the sender-to-receiver channel is not valid for the receiver-to-sender channel, the receiver-to-sender channel may be calibrated and/or accounted for separate from the sender-to-receiver channel.

Figure 7:
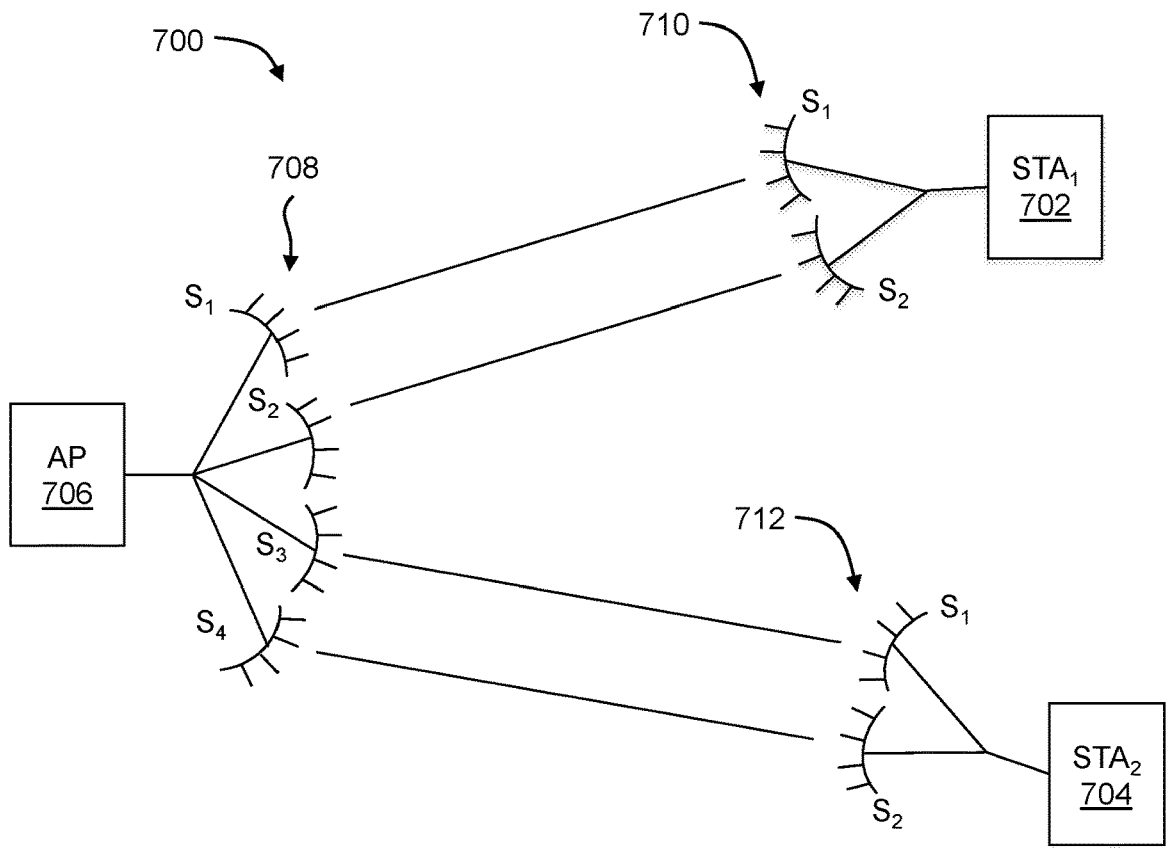
FIG. 7 illustrates another example operating environment with multiple receive sectors that may implement early link detection based adaptive selection of receive parameters.

FIG. 7 illustrates another example operating environment 700 that may implement early link detection based adaptive selection of receive parameters, arranged in accordance with at least one implementation described herein. The environment 700 includes multiple STAs, including a first $STA_1$ 702 and a second $STA_2$ 704, collectively referred to herein as STAs 702, 704. The environment 700 additionally includes an AP 706. The STAs 702, 704 and the AP 706 may respectively include or correspond to the STAs 102, 104 and the AP 106 of FIG. 1 and/or the STAs 502, 504 and the AP 506 of FIG. 5.

As illustrated, the AP 706 includes an adaptive directional antenna 708 with multiple sectors $S_1$-$S_4$ of phase arrays. Each of the STAs 702, 704 may similarly include a corresponding adaptive directional antenna 710, 712 with multiple sectors $S_1$, $S_2$ of phase arrays. In an example implementation, one or more of the STAs 702, 704 may have no coverage or limited coverage on a few of the sectors of the adaptive directional antenna 708 of the AP 706, and/or vice versa. For example, the first $STA_1$ 702 may only be received on sectors $S_1$ and $S_2$ of the adaptive directional antenna 708 of the AP 706, while the second $STA_2$ 704 may only be received on sectors $S_3$ and $S_4$ of the adaptive directional antenna 708. In an example implementation described herein, for a given link between the AP 706 and a corresponding one of the STAs 702, 704, a controller of the AP 706, such as the controller 204 of FIG. 2, may select one or more of the sectors $S_1$-$S_4$, a particular polarization, a particular RX BF pattern, and/or other RF receive parameter(s) and may configure the AP 706 to receive packets for the link using the selected RF receive parameters to maximize a receive signal-to-noise ratio (SNR) for the link.

Figure 8:
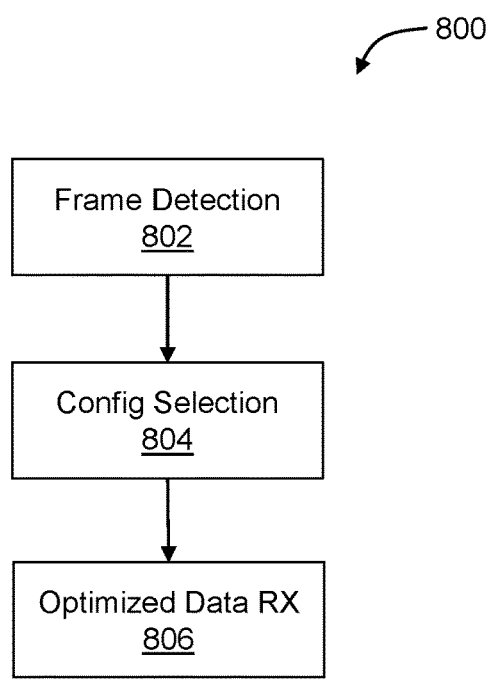
FIG. 8 is a flowchart of an example method of adaptive directionality.

FIG. 8 is a flowchart of an example method 800 of adaptive directionality, arranged in accordance with at least one implementation described herein. The method 800 may include or be included in methods of early link detection based adaptive selection of receive parameters. The method 800 may be implemented, in whole or in part, by one or more of the first $STA_1$ 702, the second $STA_2$ 704, the AP 706, the transceiver 200, and/or more generally by a receiver node that receives packets from a sender node. Alternatively or additionally, execution of the controller 204 by the processor device 270 of FIG. 2 may cause the processor device 270 to perform or control performance of one or more of the operations or blocks of the method 800.

The method 800 may include one or more of a frame detection block 802, a config selection block 804, and an optimized data receive RX block 806.

In the frame detection block 802, a receiver node may detect arrival of a packet at the receiver node using at least one of multiple available sectors. Detecting arrival of the packet may include detecting OTA energy with at least one of the sectors. For example, OTA energy in excess of an energy threshold may be detected as arrival of a packet.

In the config selection block 804, all of the sectors may generate a corresponding RX signal and one or more metrics of the RX signal for each sector may be generated from a pre-payload portion of the packet. The metric(s) may include RSSI, CSI, OTA energy level, and/or other suitable metric. One or more of the sectors that has a better metric(s) than at least one other sector may be selected to receive a payload of the packet. The particular sector(s) used to receive the payload of the packet is one example of an RF receive parameter that may be dynamically selected.

Alternatively or additionally, an RX BF pattern may be selected to receive the payload of the packet. In an example, CSI from the pre-payload portion can be used for implicit training and estimation to determine an optimized RX BF pattern to receive the payload of the packet. In another example, training and estimation may be done previously for various sender nodes and optimized RX BF patterns may be saved for each of the sender nodes. Subsequently, the RX BF pattern may be selected by identifying a sender node of the packet from the pre-payload portion of the packet and then retrieving and using the corresponding saved RX BF pattern to receive packets from the identified sender node. The particular RX BF pattern used to receive the payload of the packet is another example of an RF receive parameter that may be dynamically selected.

Alternatively or additionally, a particular polarization of the receive antenna and/or one or more sectors thereof may be selected to receive the payload of the packet. In an example, an optimal polarization may be determined by performing training, e.g., operating each sector sequentially in different polarizations, generating one or more metrics for each sector operating in each polarization, and then selecting a polarization that has better metric(s) than other polarization(s). In another example, polarization training may be done previously for various sender nodes and optimized polarizations may be saved for each of the sender nodes. Subsequently, the polarization may be selected by identifying the sender node of the packet from the pre-payload portion of the packet and then retrieving and using the corresponding saved polarization to receive packets from the identified sender node. The particular polarization used to receive the payload of the packet is yet another example of an RF receive parameter that may be dynamically selected.

In the optimized data RX block 806, the payload of the packet may be received using the selected RF receive parameter(s) from the config selection block 804.

Figure 9:
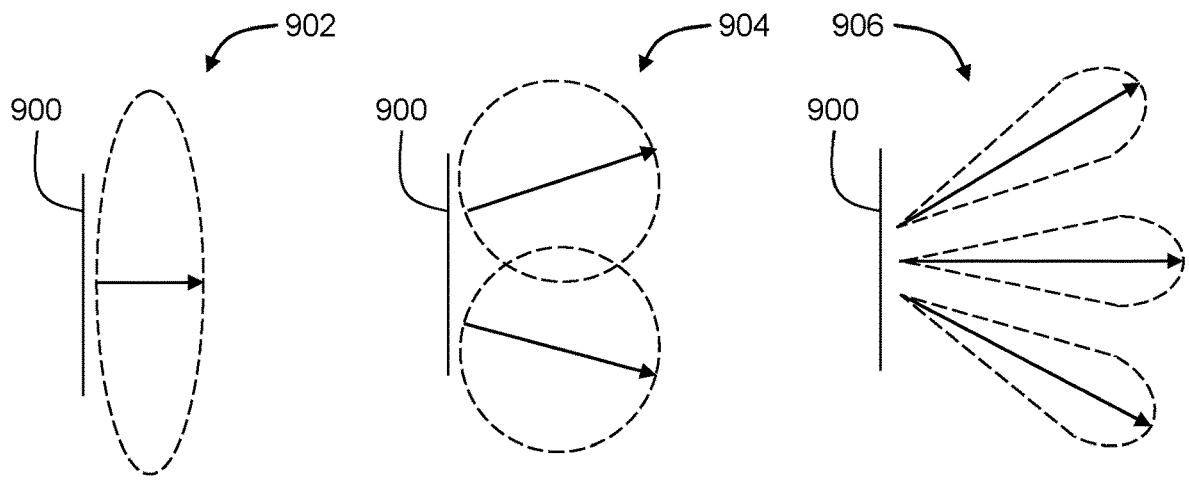
FIG. 9 illustrates various example RF footprints or coverage patterns of an adaptive directional antenna.

FIG. 9 illustrates various example RF footprints or coverage patterns 902, 904, 906 of an adaptive directional antenna 900, arranged in accordance with at least one embodiment described herein. The adaptive directional antenna 900 may include or correspond to one or more of the adaptive directional antennas 708, 710, 712 of FIG. 7. The RF footprints 902, 904, 906 include an omni receive pattern 902, a coarse quasi-omni receive pattern 904, and a fine receive pattern 906.

The patterns 902, 904, 906 depict the tradeoff between power and coverage. The omni receive pattern 902 is the coarsest and maximizes coverage but decreases the overall gain compared to the other two patterns 904, 906. The fine receive pattern 906 maximizes gain in a few select directions but decreases coverage. The coarse quasi-omni receive pattern 904 is a compromise between the omni receive pattern 902 and the fine receive pattern 906, with lower coverage and better directional gain in a few select directions than the omni receive pattern 902 and better coverage and lower directional gain than the fine receive pattern 906.

During the frame detection block 802 and/or the config selection block 804 of FIG. 8, the RF footprint or directional pattern of the antenna 900 may be chosen as a function of the current metric being optimized. Alternatively or additionally, the RF footprint of the antenna 900 may be kept as the omni receive pattern 902 in the frame detection block 802, the coarse quasi-omni receive pattern 904 in the config selection block 804, and fine/directional receive pattern 906 in the optimized data RX block 806.

Figure 10:
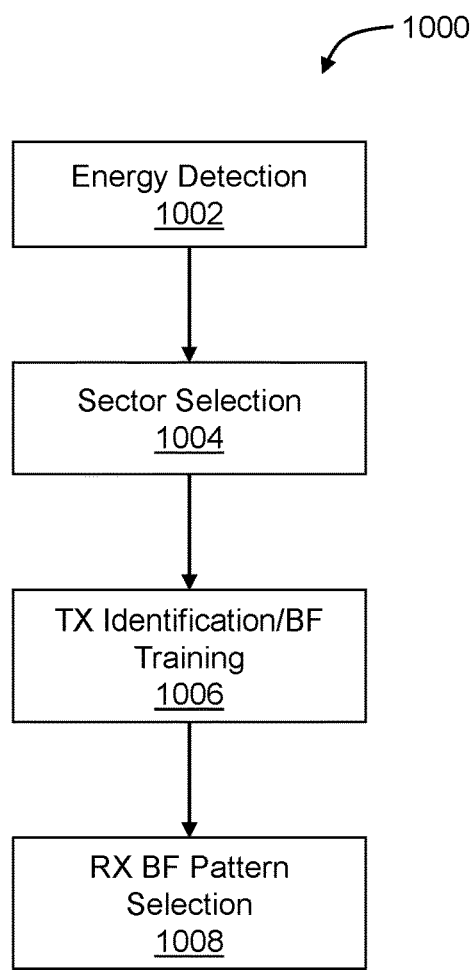
FIG. 10 is a flowchart of another example method of adaptive directionality.

FIG. 10 is a flowchart of another example method 1000 of adaptive directionality, arranged in accordance with at least one implementation described herein. The method 1000 may include or be included in methods of early link detection based adaptive selection of receive parameters. The method 1000 may be implemented, in whole or in part, by one or more of the first $STA_1$ 702, the second $STA_2$ 704, the AP 706, the transceiver 200, a receiver node that includes the antenna 900, and/or more generally by a receiver node that receives packets from a sender node. Alternatively or additionally, execution of the controller 204 by the processor device 270 of FIG. 2 may cause the processor device 270 to perform or control performance of one or more of the operations or blocks of the method 1000.

The method 1000 may include one or more of an energy detection block 1002, a sector selection block 1004, a TX identification and/or BF training block 1006, and an RX BF pattern selection block 1008.

The energy detection block 1002 may include or correspond to the frame detection block 802 of FIG. 8. For example, the energy detection block 1002 may include detecting OTA energy to detect arrival of a packet. The energy detection block 1002 may use all or a subset of the available sectors of an antenna, each of the used sectors operating with an omni receive pattern, a coarse-quasi omni receive pattern, a fine pattern, or other suitable RF coverage pattern. In an example, the energy detection block 1002 may use a single one of multiple available sectors, the single sector operating with the omni receive pattern, to reduce power consumption, e.g., during an idle state.

The sector selection block 1004 may include or correspond to at least a portion of the config selection block 804 of FIG. 8. For example, the sector selection block 1004 may include measuring a metric at each of the sectors of the antenna and choosing one or more of the sectors to receive the payload of the packet based on the metric. In an example, the sector that has the best metric may be selected to receive the payload of the packet.

The TX identification and/or BF training block 1006 may include or correspond to at least a portion of the config selection block 804 of FIG. 8. For example, the TX identification and/or BF training block 1006 may include identifying a sender node of the packet from information included in or derived from a pre-payload portion of the packet. Alternatively or additionally, the TX identification and/or BF training block 1006 may include extracting or deriving CSI and/or other information from the pre-payload portion of the packet and using the extracted and/or derived information for BF training and estimation.

The RX BF pattern selection block 1008 may include or correspond to at least a portion of the config selection block 804 of FIG. 8. For example, the RX BF pattern selection block 1006 may include selecting an RX BF pattern to receive the payload of the packet. The RX BF pattern may be selected by retrieving a previously stored RX BF pattern for the sender node identified in the TX identification and/or BF training block 1006. Alternatively or additionally, the RX BF pattern may be selected by selecting the RX BF pattern determined from BF training and estimation performed in the TX identification and/or BF training block 1006.

Although not illustrated in FIG. 10, the method 1000 may further include a polarization selection block that may include or correspond to the polarization training and/or selection of the config selection block 804 of FIG. 8.

After selecting the sector, the RX BF pattern, the polarization, and/or other RF receive parameters, the antenna may be configured to receive the payload of the packet with the selected RF receive parameters and may then receive the payload of the packet.

Figure 11A:
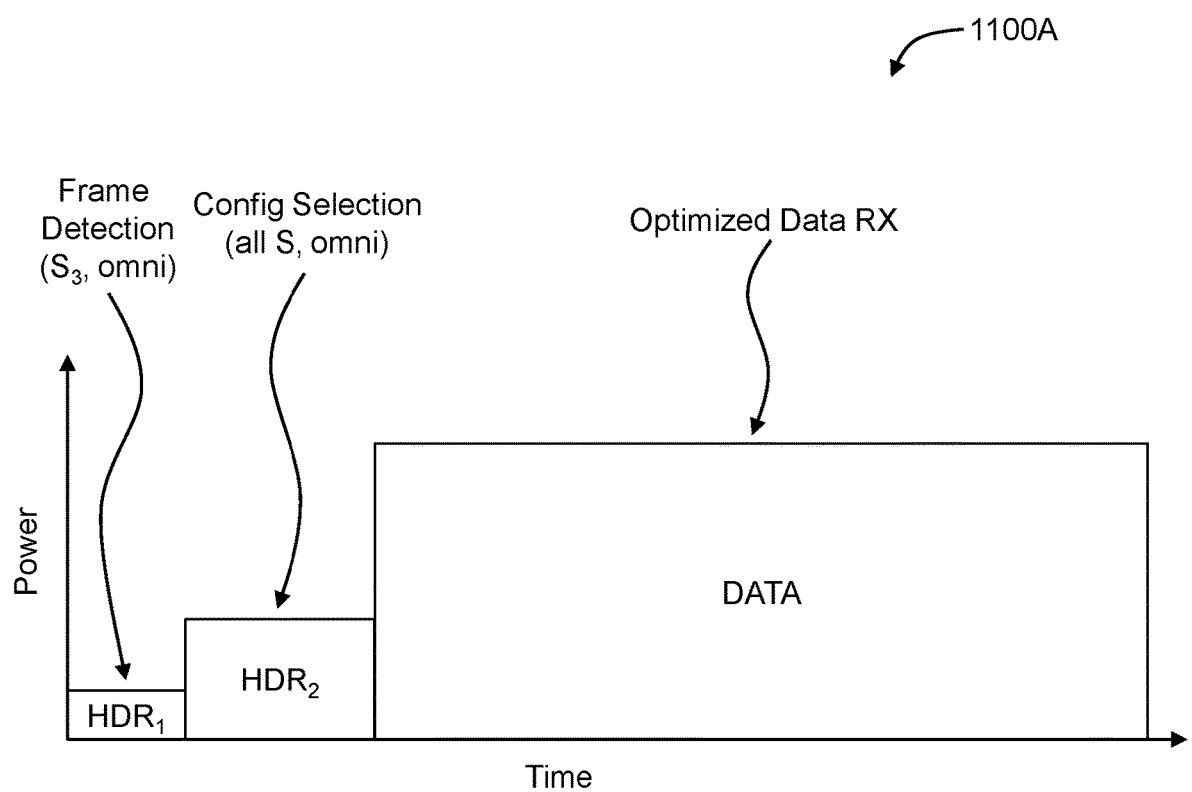
FIGS. 11A-11C illustrate various example implementations of the method of FIG. 8.
Figure 11B:
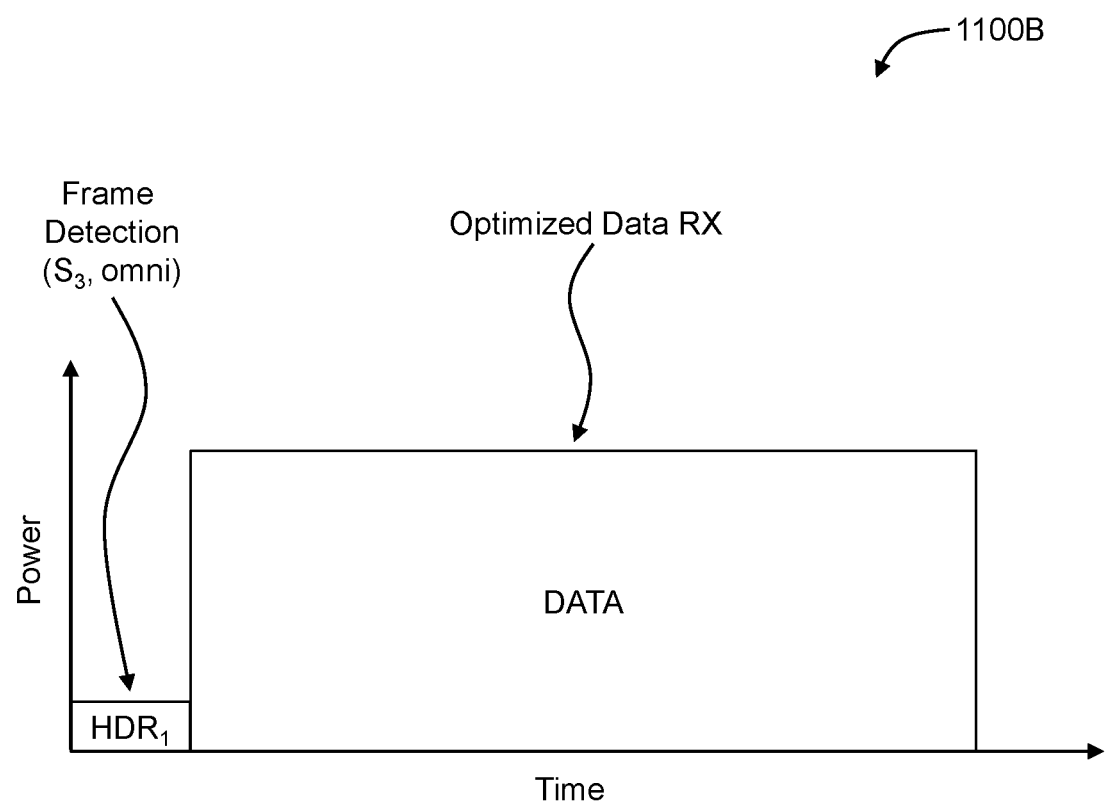
Figure 11C:
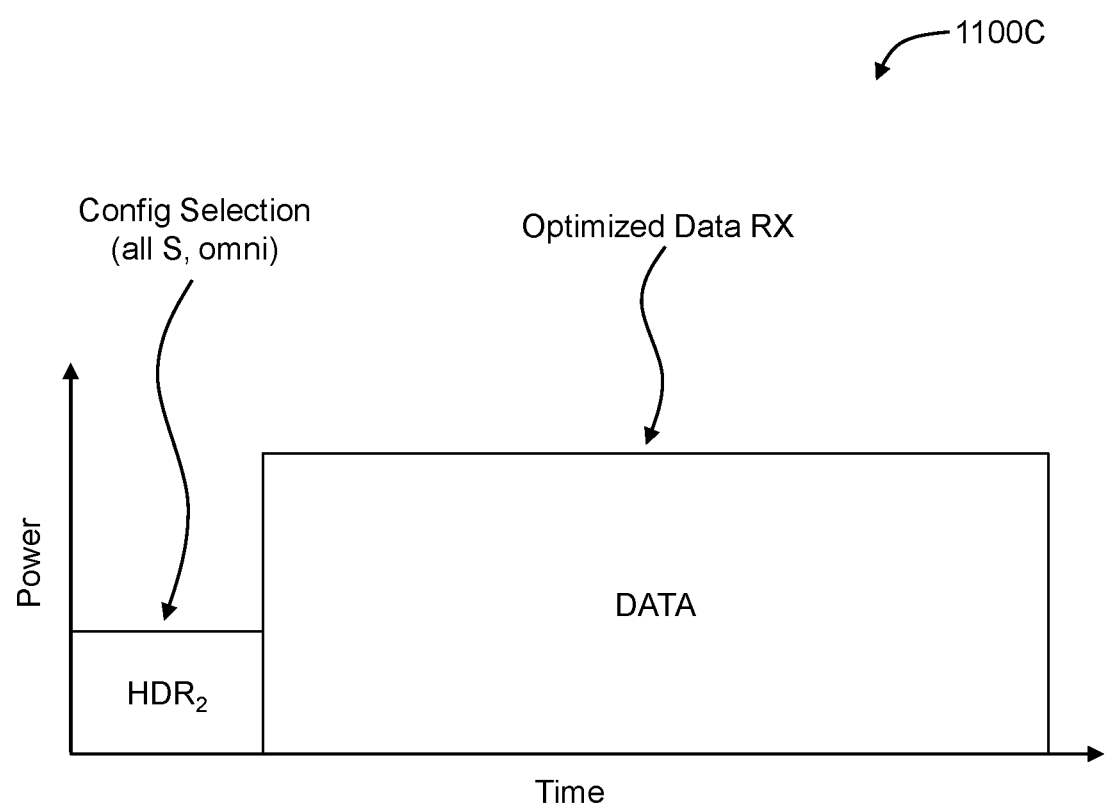

FIGS. 11A-11C illustrate various example implementations of the method 800 of FIG. 8, arranged in accordance with at least one embodiment described herein. Each of FIGS. 11A-11C includes a graphical representation of 1100A, 1100B, 1100C of antenna power as a function of time.

In FIG. 11A, frame detection is performed on a first pre-payload portion of an incoming packet, such as on a first header (HDR$_1$) of the packet. The frame detection is performed using a single sector S$_3$, of multiple sectors of an antenna, operating in an omni receive pattern in this example. Antenna power is therefore relatively low during frame detection.

In FIG. 11A, config selection is performed on a second pre-payload portion of the packet, such as on a second header (HDR$_2$) of the packet. The config selection is performed using all sectors S of the antenna operating in the omni receive configuration in this example. Antenna power is at an intermediate level during config selection.

In FIG. 11A, optimized data reception is performed on the payload of the packet, labeled DATA in FIG. 11A. The optimized data reception may be performed using one or more selected sectors, polarization, and/or RX BF pattern selected during config selection. Antenna power is relatively higher during optimized data reception to obtain adequate SNR of the received signal.

As illustrated in FIG. 11B, a config selection block as described with respect to FIG. 8 and/or a sector selection block and/or a polarization selection block as described with respect to FIG. 10 may be partially or completely omitted. For example, the sector(s), polarization, and/or RX BF pattern to receive the payload of the packet may be fixed or retrieved from a lookup. The example implementation of FIG. 11B may or may not include the TX identification and/or BF training block 1006 of FIG. 10. Alternatively or additionally, the OTA energy detected in the frame detection block may be sufficient to identify a sender node of the packet, and a particular sector, polarization, and/or RX BF pattern in storage from prior use may be selected based on the identified sender. The implementation of FIG. 11B may be faster than the implementation of FIG. 11A at the expense of a lower level of optimization for receipt of the payload of the packet.

As illustrated in FIG. 11C, a frame detection block as described with respect to FIG. 8 and/or an energy detection block as described with respect to FIG. 10 using a single sector of the antenna or may be partially or completely omitted. For example, all sectors of the antenna may be on and operating in the omni receive configuration and all may detect OTA energy to detect arrival of the packet. Simultaneously, one or more metrics may be generated at each sector to determine which of the sectors to select to receive the payload of the packet. The implementation of FIG. 11C may be somewhat faster than the implementation of FIG. 11A at the expense of higher power consumption during the idle state.

Figure 12:
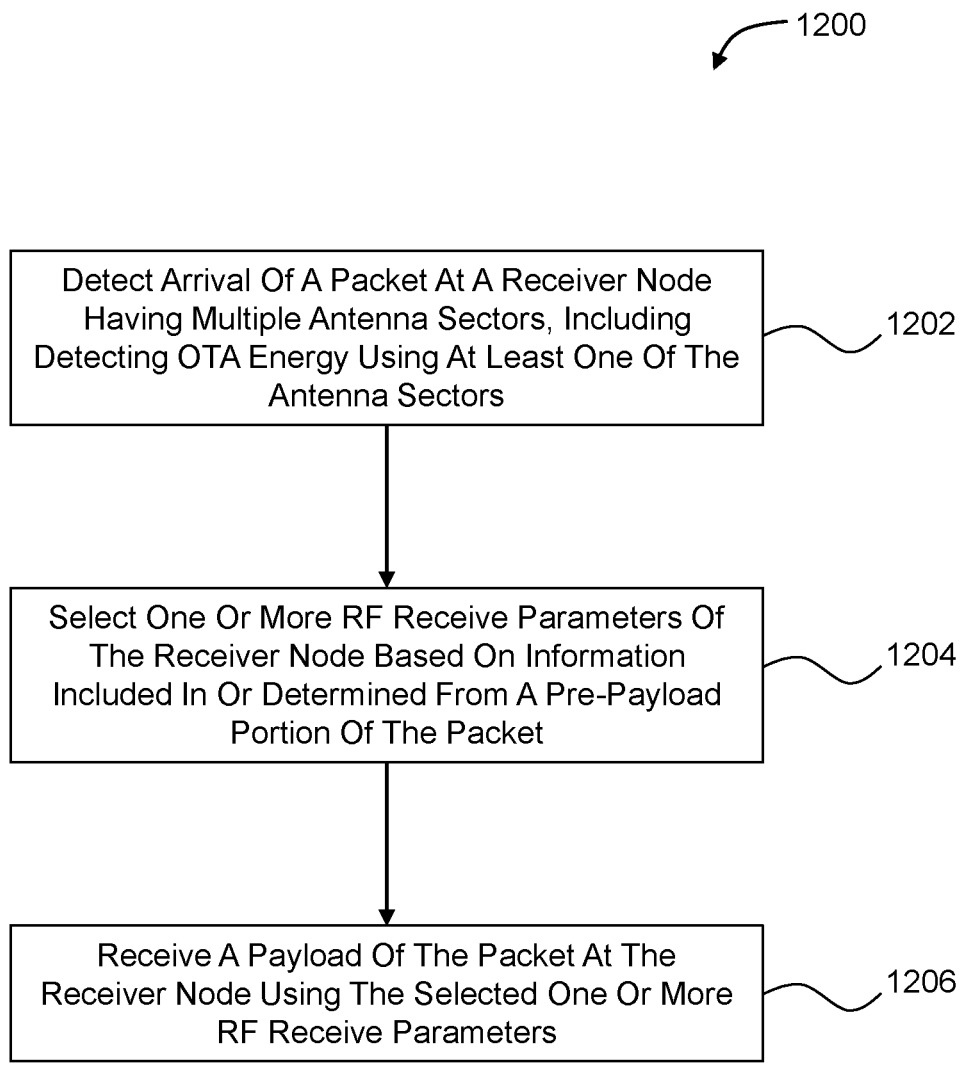
FIG. 12 is a flowchart of another example method of adaptive directionality.

FIG. 12 is a flowchart of another example method 1200 of adaptive directionality, arranged in accordance with at least one implementation described herein. The method 1200 may include or be included in methods of early link detection based adaptive selection of receive parameters. The method 1200 may be implemented, in whole or in part, by one or more of the first STA$_1$ 702, the second STA$_2$ 704, the AP 706, the transceiver 200, a receiver node that includes the antenna 900, and/or more generally by a receiver node that receives packets from a sender node. Alternatively or additionally, execution of the controller 204 by the processor device 270 of FIG. 2 may cause the processor device 270 to perform or control performance of one or more of the operations or blocks of the method 1200. Alternatively or additionally, some or all of the method 1200 may include or be included in the method 800 or the method 1000, or vice versa.

At block 1202, the method 1200 may include detecting arrival of a packet at a receiver node. The receiver node may have multiple antenna sectors. Detecting arrival of the packet may include detecting OTA energy using at least one of the antenna sectors. Detecting OTA energy using at least one of the antenna sectors at block 1202 may include detecting OTA energy using a first antenna sector of the antenna sectors. The first antenna sector may have an omni receive pattern during detection of the OTA energy. The other antenna sectors may or may not be turned on during detection of OTA energy in this example. Block 1202 may be followed by block 1204.

At block 1204, the method 1200 may include selecting one or more RF receive parameters of the receiver node based on information included in or determined from a pre-payload portion of the packet. Selecting the one or more RF receive parameters of the receiver node based on information included in or determined from the pre-payload portion of the packet at block 1204 may include selecting one or more of the antenna sectors to receive the payload of the packet based on one or more sector-specific metrics included in or determined from the pre-payload portion of the packet. The selected antenna sector(s) may have better sector-specific metric(s) than at least one other antenna sector of the antenna sectors.

Alternatively or additionally, selecting the one or more RF receive parameters of the receiver node based on information included in or determined from the pre-payload portion of the packet at block 1204 may include selecting an antenna polarization to receive the payload of the packet based on one or more metrics included in or determined from the pre-payload portion of the packet. The selected antenna polarization may have better metrics than at least one other antenna polarization.

Alternatively or additionally, selecting the one or more RF receive parameters of the receiver node based on information included in or determined from the pre-payload portion of the packet at block 1204 may include selecting an RX BF pattern to receive the payload of the packet according to a sender node of the packet identified based on the pre-payload portion of the packet. Block 1204 may be followed by block 1206.

At block 1206, the method 1200 may include receiving a payload of the packet at the receiver node using the selected one or more RF receive parameters of the receiver node. Receiving the payload of the packet at the receiver node using the selected one or more RF receive parameters of the receiver node at block 1206 may include receiving the payload of the packet at the receiver node using one or more of the antenna sectors each having a fine directional receive pattern during receipt of the payload of the packet In an example, the method 1200 may further include determining, from the pre-payload portion of the packet, one or more sector-specific metrics for each of the antenna sectors. The method may also include comparing the sector-specific metrics of each of the antenna sectors to each other. In this example, selecting the one or more RF receive parameters of the receiver node based on information included in or determined from the pre-payload portion of the packet at block 1204 may include selecting a first subset of the antenna sectors that each has one or more sector-specific metrics that is better than one or more sector-specific metrics of each of a second subset of the antenna sectors to receive the payload of the packet.

In an example, the method 1200 may further include determining from the pre-payload portion of the packet a sender node that sent the packet to the receiver node. In this example, selecting the one or more RF receive parameters of the receiver node based on information included in or determined from the pre-payload portion of the packet at block 1204 may include selecting an RX BF pattern used previously to receive packets from the sender node to receive the payload of the packet.

In an example, the method 1200 may further include determining from the pre-payload portion of the packet one or more sector-specific metrics for each of the antenna sectors. Each of the antenna sectors may have a coarse quasi-omni receive pattern during determination of the one or more sector-specific metrics.

In an example, the method 1200 may further include allocating unique preamble modulation schemes to multiple associated wireless STAs. The method 1200 may also include determining from the pre-payload portion of the packet a sender wireless STA from among the associated wireless STAs that sent the packet to the receiver node. In this example, determining the sender wireless STA may include identifying a corresponding unique preamble modulation scheme from the pre-payload portion of the packet.

In an example, the method 1200 may further include determining from the pre-payload portion of the packet a sender node that sent the packet to the receiver node. Determining the sender node from the pre-payload portion may include extracting at least a portion of an association identifier (AID) from the pre-payload portion, where the AID identifies the sender node.

Figure 13:
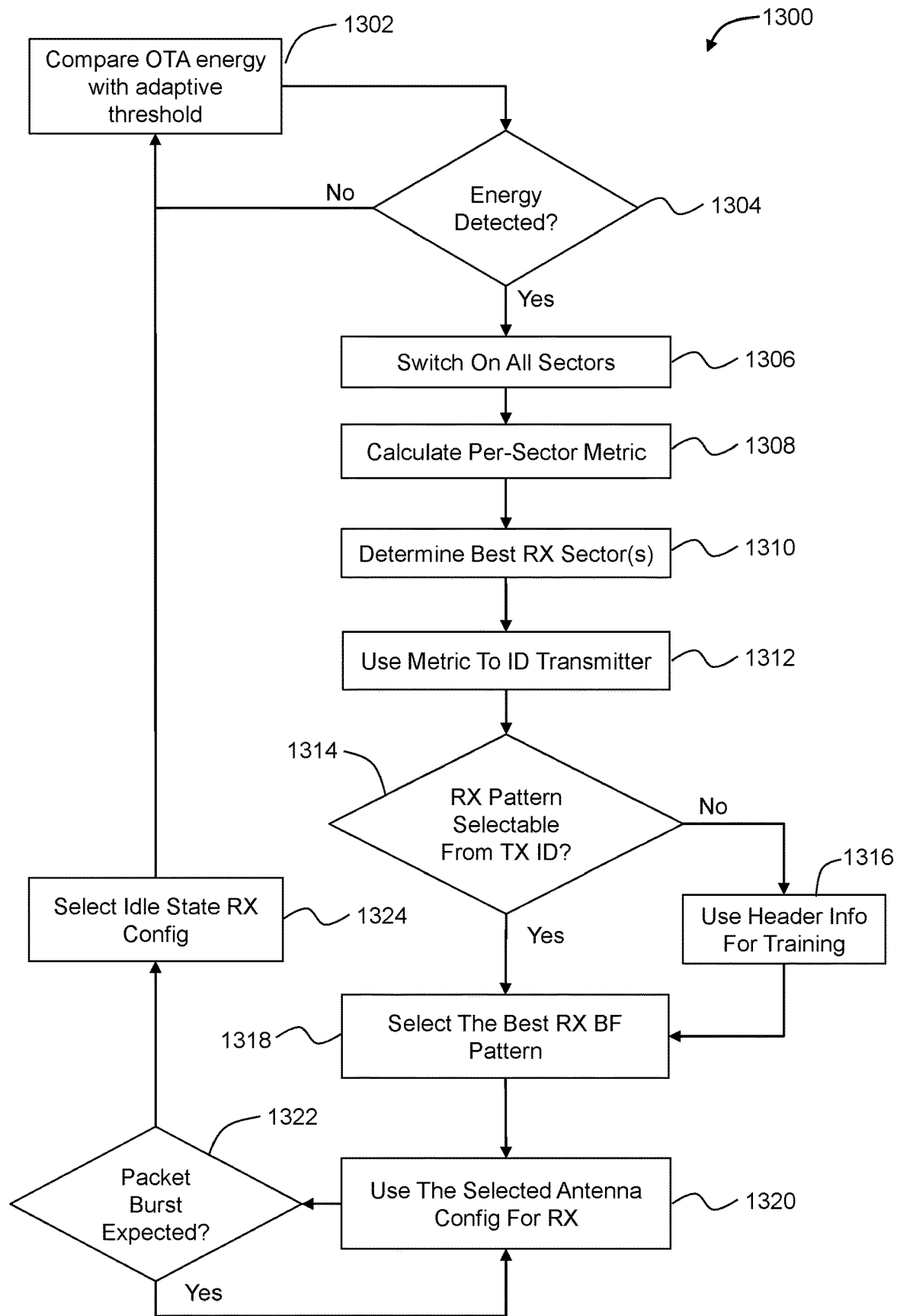
FIG. 13 is a flow chart of another example method of adaptive directionality.

FIG. 13 is a flow chart of another example method 1300 of adaptive directionality, arranged in accordance with at least one implementation described herein. The method 1300 may include or be included in methods of early link detection based adaptive selection of receive parameters. The method 1300 may be implemented, in whole or in part, by one or more of the first $STA_1$ 702, the second $STA_2$ 704, the AP 706, the transceiver 200, a receiver node that includes the antenna 900, and/or more generally by a receiver node that receives packets from a sender node. Alternatively or additionally, execution of the controller 204 by the processor device 270 of FIG. 2 may cause the processor device 270 to perform or control performance of one or more of the operations or blocks of the method 1300. Alternatively or additionally, some or all of the method 1300 may include or be included in the method 800, the method 1000, and/or the method 1200, or vice versa.

At block 1302, the method 1300 compares OTA energy with an adaptive threshold. At block 1304, the method 1300 determines whether energy is detected and in response to a negative determination (No) returns to block 1302 to repeat the comparison.

In response to a positive determination (Yes) at block 1304, e.g., a determination that energy is detected, the method 1300 continues to block 1306 to switch on all sectors. The method 1300 calculates one or more per-sector metrics at block 1308, determine one or more best receive sectors (or at least better receive sectors) at block 1310, and uses the metrics to identify a sender node, e.g., a transmitter, at block 1312. For example, the transmitter can be identified based on information in or derived from the preamble/header or other pre-payload portion, like RSSI, CSI etc.

At block 1314, the method 1300 determines if a RX BF pattern is selectable from the identified transmitter. In response to a negative determination (No) at block 1314 and/or in the event the transmitter is not identified at block 1312, the method 1300 proceeds to block 1316 to use header info for training, such as implicit beamforming/MRC training/estimation. In response to a positive determination (Yes) at block 1314, and/or following block 1316, the method 1300 proceeds to block 1318 to select the best (or at least a relatively better) RX BF pattern, either based on the identified transmitter or determined from the training. At block 1320, the selected antenna configuration (e.g., the antenna configured with the selected RF receive parameters) is used to receive the payload of the packet.

At block 1322, the method 1300 determines whether a packet burst is expected. In response to a negative determination (No) at block 1322, the method 1300 proceeds to block 1324 to select an idle state receiving configuration (e.g., idle state RF receive parameters) and returns to block 1302 to compare OTA energy with the adaptive threshold. In response to a positive determination (Yes) at block 1322 that a packet burst is expected, the method 1300 returns to block 1320 to uses the selected antenna configuration to receive the remainder of the transmission.

In some example implementations, the method 1300 may be implemented with different, fewer, or more blocks. The method 1300 may be implemented as processing logic of a circuit and/or in computer executable instructions, which can be stored on a medium, loaded onto one or more processors of one or more computing devices, and executed as a computer-implemented method.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined operations leading to a desired end state or result. In example implementations, the operations carried out require physical manipulations of tangible quantities for achieving a tangible result.

Unless specifically stated otherwise, as apparent from the discussion, it is appreciated that throughout the description, discussions utilizing terms such as detecting, determining, analyzing, identifying, scanning or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium.

Unless specific arrangements described herein are mutually exclusive with one another, the various implementations described herein can be combined to enhance system functionality and/or to produce complementary functions. Such combinations will be readily appreciated by those skilled in the art given the totality of the foregoing description. Likewise, aspects of the implementations may be implemented in standalone arrangements where more limited and thus specific component functionality is provided within each of the interconnected—and therefore interacting—system components albeit that, in sum, they together support, realize and produce the described real-world effect(s). Indeed, it will be understood that unless features in the particular implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will, therefore, be appreciated that the above description has been given by way of example only and that modification in detail may be made within the scope of the present invention.

Embodiments described herein may be implemented using computer-readable media for carrying or having computer-executable instructions or data structures stored thereon. Such computer-readable media may be any available media that may be accessed by a general-purpose or special-purpose computer. By way of example, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

Computer-executable instructions may include, for example, instructions and data which cause a general-purpose computer, special-purpose computer, or special-purpose processing device (e.g., one or more processors) to perform or control performance of a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some implementations, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as "an aspect" may refer to one or more aspects and vice versa. A phrase such as "an embodiment" or "an implementation" does not imply that such embodiment or implementation is essential to the subject technology or that such embodiment or implementation applies to all configurations of the subject technology. A disclosure relating to an embodiment or implementation may apply to all embodiments or implementations, or one or more embodiments or implementations. An embodiment or implementation may provide one or more examples of the disclosure. A phrase such as "an embodiment" or "an implementation" may refer to one or more embodiments or implementations and vice versa. A phrase such as "a configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as "a configuration" may refer to one or more configurations and vice versa.

An example implementation includes receiving a pre-payload portion of a packet at a receiver node, identifying a link associated with a sender node of the packet based on the pre-payload portion, selecting and loading one or more baseband receive parameters associated with the identified link at the receiver node, receiving a payload of the packet at the receiver node using the one or more baseband receive parameters.

In an example, loading the one or more baseband receive parameters at the receiver node can include configuring a baseband circuit of the receiver node with at least one of a specific automatic gain control (AGC) gain, a specific equalizer type, specific interference rejection, specific filtering, or other specific baseband receive parameters.

In an example, identifying the link based on the pre-payload portion can include extracting current channel state information (CSI) from the pre-payload portion. In some examples, identifying the link based on the pre-payload portion further can be further based on determining a current signature of the current CSI (e.g., compression, linear or non-linear transformation, decimation, quantization, eigen-directions, deep faded, location of null/dips, etc.). In another example, identifying the link based on the pre-payload portion can be further based on comparing the current signature against a historic signature of each of one or more links (e.g., that include the identified link). In an example, extracting the current CSI can include estimating an H matrix of the identified link.

In an example, comparing the current signature against the historic signature of each of the one or more links can include calculating a distance between the current signature and the historic signature of each of the one or more links; and selecting a link of the one or more links with a historic signature that is closest to the current signature as the identified link In an example, loading the one or more historic signatures of the one or more links onto the receiver node, the historic signatures can be generated by a different device than the receiver node. In another example, generating the historic signature of each of the one or more links. In an example, generating the historic signature of each of the one or more links can include extracting over time CSI of each of the one or more links from packets sent to the receiver node over each of the one or more links; clustering the extracted CSI for each of the one or more links based on one or more source addresses included in the packets, each of the one or more source addresses identifying a corresponding one of one or more sender nodes that include the sender node; and/or deriving the historic signature of each of the one or more links from the clustered extracted CSI of each of the one or more links.

In an example implementation, after receiving the payload of the packet at the receiver node, the process can include determining that the current signature of the identified link has changed and does not correlate to a historic signature of the identified link; and triggering a security event in response to determining that the current signature of the identified link has changed and does not correlate to the historic signature of the identified link. For example, triggering the security event can include disassociating the sender node from the receiver node. Receiving the pre-payload portion of the packet at the receiver node can include receiving the pre-payload portion of the packet at an access point. In an example, receiving the pre-payload portion of the packet at the receiver node can include receiving the pre-payload portion of the packet at a wireless station (STA). In another example, receiving the pre-payload portion of the packet can include receiving a legacy-long training field (L-LTF) of the packet.

Another example implementation can include detecting arrival of a packet at a receiver node having multiple antenna sectors, including detecting over the air energy using at least one of the multiple antenna sectors; selecting one or more radio frequency (RF) receive parameters of the receiver node based on information included in or determined from a pre-payload portion of the packet; and receiving a payload of the packet at the receiver node using the selected one or more RF receive parameters of the receiver node.

In an example, selecting the one or more RF receive parameters of the receiver node can be based on information included in or determined from the pre-payload portion of the packet and can include selecting one or more antenna sectors of the multiple antenna sectors to receive the payload of the packet based on one or more sector-specific metrics included in or determined from the pre-payload portion of the packet. the selected one or more antenna sectors can be based on the better one or more sector-specific metrics than at least one other antenna sector of the multiple antenna sectors.

In an example, one or more sector-specific metrics for each of the multiple antenna sectors can be determined from the pre-payload portion of the packet; and then the process can compare the one or more sector-specific metrics of each of the multiple antenna sectors to each other. Selecting the one or more RF receive parameters of the receiver node can be based on information included in or determined from the pre-payload portion of the packet can include selecting a first subset of the multiple antenna sectors that each has one or more sector-specific metrics that is better than one or more sector-specific metrics of each of a second subset of the multiple antenna sectors to receive the payload of the packet.

In an example, selecting the one or more RF receive parameters of the receiver node based on information included in or determined from the pre-payload portion of the packet can include selecting an antenna polarization to receive the payload of the packet based on one or more metrics included in or determined from the pre-payload portion of the packet, the selected antenna polarization having better one or more metrics than at least one other antenna polarization.

In an example, selecting the one or more RF receive parameters of the receiver node based on information included in or determined from the pre-payload portion of the packet can include selecting a receive beamforming pattern to receive the payload of the packet according to a sender node of the packet identified based on the pre-payload portion of the packet.

In an example, determining from the pre-payload portion of the packet a sender node that sent the packet to the receiver node, where selecting the one or more RF receive parameters of the receiver node based on information included in or determined from the pre-payload portion of the packet can include selecting a receive beamforming pattern used previously to receive packets from the sender node.

In an example, detecting over the air energy using at least one of the multiple antenna sectors can include detecting over the air energy using a first antenna sector of the multiple antenna sectors, the first antenna sector having an omni receive pattern during detection of the over the air energy.

In an example, determining from the pre-payload portion of the packet one or more sector-specific metrics for each of the multiple antenna sectors, each of the multiple antenna sectors having a coarse quasi-omni receive pattern during determination of the one or more sector-specific metrics.

In an example, receiving the payload of the packet at the receiver node using the selected one or more RF receive parameters of the receiver node can include receiving the payload of the packet at the receiver node using one or more of the multiple antenna sectors each having a fine directional receive pattern during receipt of the payload of the packet.

In an example, allocating unique preamble modulation schemes to a multiple associated wireless stations (STAs); and determining from the pre-payload portion of the packet a sender wireless STA from among the multiple associated wireless STAs that sent the packet to the receiver node. Determining the sender wireless STA can include identifying a corresponding unique preamble modulation scheme from the pre-payload portion. In an example, determining from the pre-payload portion of the packet a sender node that sent the packet to the receiver node, including extracting at least a portion of an association identifier (AID) from the pre-payload portion, the AID identifying the sender node.

A further example implementation can include receiving a pre-payload portion of a packet at a receiver node; identifying a link associated with a sender node of the packet based on the pre-payload portion; selecting and loading one or more baseband receive parameters associated with the identified link at the receiver node; selecting one or more radio frequency (RF) receive parameters of the receiver node based on information included in or determined from the pre-payload portion of the packet; and receiving a payload of the packet at the receiver node using the one or more baseband receive parameters and the one or more RF receive parameters.

In an example, loading the one or more baseband receive parameters at the receiver node can include configuring a baseband circuit of the receiver node with at least one of a specific automatic gain control (AGC) gain, a specific equalizer type, specific interference rejection, specific filtering, or other specific baseband receive parameters.

Selecting the one or more RF receive parameters of the receiver node can include different approaches such as selecting a first subset of multiple antenna sectors of the receiver node that each has one or more sector-specific metrics that is better than one or more sector-specific metrics of each of a second subset of the multiple antenna sectors to receive the payload of the packet; selecting an antenna polarization to receive the payload of the packet based on one or more metrics included in or determined from the pre-payload portion of the packet, the selected antenna polarization having better one or more metrics than an other antenna polarization; and/or selecting a receive beamforming pattern to receive the payload of the packet according to the sender node of the packet identified based on the pre-payload portion of the packet.

In an example, identifying the link based on the pre-payload portion can include on or more of extracting current channel state information (CSI) from the pre-payload portion; detecting an energy level of the pre-payload portion at a first antenna sector of a multiple antenna sectors of the receiver node; and detecting a current sector-specific metric of the pre-payload portion at each of a multiple antenna sectors of the receiver node.

In an example, receiving the pre-payload portion of the packet at the receiver node can include receiving the pre-payload portion of the packet at one of an access point (AP) or a wireless station (STA). In another example, receiving the pre-payload portion of the packet can include receiving a legacy-long training field (L-LTF) of the packet. A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Moreover, nothing disclosed herein is intended to be dedicated to the public regardless of whether such disclosure is explicitly recited in the above description.

The present disclosure is not to be limited in terms of the particular implementations described herein, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of this disclosure. Also, the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that include A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

For any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, and/or others. As a non-limiting example, each range discussed herein can be readily broken down into a lower third, middle third and upper third, etc. All language such as "up to," "at least," and the like include the number recited and refer to ranges which can be subsequently broken down into sub ranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, various implementations of the present disclosure have been described herein for purposes of illustration, and various modifications may be made without departing from the scope and spirit of the present disclosure. Accordingly, the various implementations disclosed herein are not intended to be limiting.

What is claimed is:

1. A method, comprising:
   detecting arrival of a packet at a receiver node having a plurality of antenna sectors, including detecting over the air energy using at least one of the plurality of antenna sectors;
   selecting one or more radio frequency (RF) receive parameters of the receiver node based on information included in or determined from a pre-payload portion of the packet, including at least one of:
      selecting a first subset of the plurality of antenna sectors that each has one or more sector-specific metrics that is better than one or more sector-specific metrics of each of a second subset of the plurality of antenna sectors to receive the payload of the packet; or
      selecting an antenna polarization to receive the payload of the packet based on one or more metrics included in or determined from the pre-payload portion of the packet, the selected antenna polarization having better one or more metrics than an other antenna polarization; and
   receiving a payload of the packet at the receiver node using the selected one or more RF receive parameters.

2. The method of claim 1, further comprising:
   determining from the pre-payload portion of the packet the one or more sector-specific metrics for each of the plurality of antenna sectors; and
   comparing the one or more sector-specific metrics of each of the plurality of antenna sectors to each other to identify the first subset of the plurality of antenna sectors that each has the one or more sector-specific metrics that is better than the one or more sector-specific metrics of each of the second subset of the plurality of antenna sectors.

3. The method of claim 1, further comprising determining from the pre-payload portion of the packet a sender node that sent the packet to the receiver node, wherein selecting the one or more RF receive parameters of the receiver node based on information included in or determined from the pre-payload portion of the packet further comprises selecting a receive beamforming pattern used previously to receive packets from the sender node.

4. The method of claim 1, wherein detecting over the air energy using at least one of the plurality of antenna sectors comprises detecting over the air energy using a first antenna sector of the plurality of antenna sectors, the first antenna sector having an omni receive pattern during detection of the over the air energy.

5. The method of claim 1, further comprising:
   after detecting arrival of the packet at the receiver node, setting a receive pattern of each of the plurality of antenna sectors to a coarse quasi-omni receive pattern; and
   determining from the pre-payload portion of the packet one or more sector-specific metrics for each of the plurality of antenna sectors while each of the plurality of antenna sectors has the coarse quasi-omni receive pattern.

6. The method of claim 1, wherein:
   selecting the one or more RF receive parameters comprises selecting the first subset of the plurality of antenna sectors to receive the payload of the packet;
   the method further comprises, prior to receiving the payload of the packet at the receiver node, setting a receive pattern of each antenna sector of the first subset of the plurality of antenna sectors to a fine directional receive pattern; and
   receiving the payload of the packet at the receiver node using the selected one or more RF receive parameters comprises receiving the payload of the packet using the first subset of the plurality of antenna sectors each having the fine directional receive pattern.

7. The method of claim 1, further comprising:
   allocating unique preamble modulation schemes to a plurality of associated wireless stations (STAs); and
   determining from the pre-payload portion of the packet a sender wireless STA from among the plurality of associated wireless STAs that sent the packet to the receiver node, wherein determining the sender wireless STA comprises identifying from the pre-payload portion a corresponding unique preamble modulation scheme allocated to the sender wireless STA.

8. The method of claim 1, further comprising determining from the pre-payload portion of the packet a sender node that sent the packet to the receiver node, including extracting at least a portion of an association identifier (AID) from the pre-payload portion, the AID identifying the sender node.

9. A method, comprising:
  detecting arrival of a packet at a receiver node having a plurality of antenna sectors using a first subset of the plurality of antenna sectors, wherein each antenna sector included in the first subset has an omni receive pattern during detection of the over the air energy and wherein a second subset of the plurality of antenna sectors is turned off or deactivated during detection of the over the air energy;
  selecting one or more radio frequency (RF) receive parameters of the receiver node based on information included in or determined from a pre-payload portion of the packet; and
  receiving a payload of the packet at the receiver node using the selected one or more RF receive parameters.

10. The method of claim 9, further comprising:
  turning on or activating the second subset of the plurality of antenna sectors in response to detecting the arrival of the packet; and
  determining from the pre-payload portion of the packet one or more sector-specific metrics for each of the plurality of antenna sectors,
  wherein:
    selecting the one or more RF receive parameters comprises selecting a third subset of the plurality of antenna sectors to receive the payload of the packet in response to the one or more sector-specific metrics of each antenna sector of the third subset being better than one or more sector-specific metrics of each antenna sector of a fourth subset of the plurality of antenna sectors; and
    receiving the payload of the packet comprises receiving the payload of the packet using the third subset of the plurality of antenna sectors.

11. The method of claim 10, further comprising, after detecting arrival of the packet at the receiver node, setting a receive pattern of each of the plurality of antenna sectors to a coarse quasi-omni receive pattern to determine the one or more sector-specific metrics for each of the plurality of antenna sectors.

12. The method of claim 10, further comprising, prior to receiving the payload of the packet at the receiver node, setting a receive pattern of each antenna sector of the third subset of the plurality of antenna sectors to a fine directional receive pattern to receive the payload.

13. The method of claim 9, wherein selecting the one or more RF receive parameters of the receiver node comprises at least one of:
  selecting an antenna polarization to receive the payload of the packet based on one or more metrics included in or determined from the pre-payload portion of the packet, the selected antenna polarization having better one or more metrics than an other antenna polarization; or
  selecting a receive beamforming pattern to receive the payload of the packet according to a sender node of the packet identified based on the pre-payload portion of the packet.

14. The method of claim 9, wherein:
  the method further comprises, prior to detecting arrival of the packet at the receiver node and for each of a plurality of sender nodes:
    operating each of the plurality of antenna sectors sequentially in different polarizations;
    generating one or more metrics for each of the plurality of antenna sectors operating in each polarization; and
    identifying a first polarization that has a better metric than a second polarization as an RF receive parameter for a corresponding one of the plurality of sender nodes;
  the method further comprises, after detecting arrival of the packet at the receiver node, determining from the pre-payload portion of the packet a sender node of the plurality of sender nodes that sent the packet to the receiver node;
  selecting the one or more RF receive parameters comprises selecting the first polarization previously identified for the determined sender node; and
  receiving the payload of the packet using the selected one or more RF receive parameters comprises receiving the payload of the packet using the first polarization previously identified for the determined sender node.

15. The method of claim 9, further comprising determining from the pre-payload portion of the packet a sender node that sent the packet to the receiver node, wherein selecting the one or more RF receive parameters of the receiver node based on information included in or determined from the pre-payload portion of the packet comprises selecting a receive beamforming pattern used previously to receive packets from the sender node.

16. The method of claim 9, further comprising:
  allocating unique preamble modulation schemes to a plurality of associated wireless stations (STAs); and
  determining from the pre-payload portion of the packet a sender wireless STA from among the plurality of associated wireless STAs that sent the packet to the receiver node, wherein determining the sender wireless STA comprises identifying from the pre-payload portion a corresponding unique preamble modulation scheme allocated to the sender wireless STA.

17. The method of claim 9, further comprising determining from the pre-payload portion of the packet a sender node that sent the packet to the receiver node, including extracting at least a portion of an association identifier (AID) from the pre-payload portion, the AID identifying the sender node.

18. A method, comprising:
  setting a radio frequency (RF) footprint of each antenna sector in a first subset of a plurality of antenna sectors to an omni receive pattern;
  detecting arrival of a packet at a receiver node having the plurality of antenna sectors, including detecting over the air energy using each antenna sector in the first subset having its RF footprint set to the omni receive pattern;
  setting the RF footprint of each of the plurality of antenna sectors to a coarse quasi-omni receive pattern to determine from a pre-payload portion of the packet one or more sector-specific metrics for each of the plurality of antenna sectors;
  selecting one or more RF receive parameters of the receiver node based on the one or more sector-specific metrics determined for each of the plurality of antenna sectors, including selecting a second subset of the plurality of antenna sectors to receive the payload of the packet;
  setting the RF footprint of each antenna sector in the second subset of the plurality of antenna sectors to a fine directional receive pattern; and
  receiving the payload of the packet at the receiver node using the second subset of the plurality of antenna sectors having the fine directional receive pattern.

19. The method of claim 18, wherein selecting the one or more RF receive parameters of the receiver node further comprises at least one of:
- selecting an antenna polarization to receive the payload of the packet based on one or more metrics included in or determined from the pre-payload portion of the packet, the selected antenna polarization having better one or more metrics than an other antenna polarization; or
- selecting a receive beamforming pattern to receive the payload of the packet according to a sender node of the packet identified based on the pre-payload portion of the packet.

20. The method of claim 18, further comprising, prior to detecting arrival of the packet, turning off or deactivating each antenna sector of the plurality of antenna sectors that is not included in the first subset of the plurality of antenna sectors such that each of the antenna sectors that is not included in the first subset is turned off or deactivated during detection of arrival of the packet.

* * * * *